US009485298B2

(12) United States Patent
Joch et al.

(10) Patent No.: US 9,485,298 B2
(45) Date of Patent: Nov. 1, 2016

(54) DEVICE WITH VIDEO BUFFER MODELING AND METHODS FOR USE THEREWITH

(75) Inventors: Anthony Peter Joch, Waterloo (CA);
Nicholas Ford, Kitchener (CA);
Roman Czeslaw Kordasiewicz, Elmira (CA); Kevin Goertz, Waterloo (CA)

(73) Assignee: NetScout Systems Texas, LLC, Westford, MA (US)

( * ) Notice: Subject to any disclaimer, the term of this patent is extended or adjusted under 35 U.S.C. 154(b) by 214 days.

(21) Appl. No.: 13/231,497

(22) Filed: Sep. 13, 2011

(65) Prior Publication Data

US 2012/0110167 A1    May 3, 2012

Related U.S. Application Data

(63) Continuation-in-part of application No. 13/053,650, filed on Mar. 22, 2011.

(60) Provisional application No. 61/407,531, filed on Oct. 28, 2010.

(51) Int. Cl.
| *H04L 12/26* | (2006.01) |
| *H04L 12/24* | (2006.01) |
| *H04L 29/06* | (2006.01) |
| *H04N 21/24* | (2011.01) |

(52) U.S. Cl.
CPC ............. *H04L 65/80* (2013.01); *H04L 41/142* (2013.01); *H04L 41/5067* (2013.01); *H04L 43/065* (2013.01); *H04L 43/08* (2013.01); *H04L 43/12* (2013.01); *H04N 21/2401* (2013.01)

(58) Field of Classification Search
CPC . H04N 21/2401; H01L 43/065; H01L 43/08; H01L 43/0876; H01L 43/12; H01L 65/80; H01L 41/142; H01L 41/5067
USPC .............................. 709/224; 725/14, 94, 98
See application file for complete search history.

(56) References Cited

U.S. PATENT DOCUMENTS

| 7,533,075 | B1 * | 5/2009 | Soferman et al. .............. 706/52 |
| 7,647,614 | B2 * | 1/2010 | Krikorian et al. .............. 725/94 |
| 9,076,484 | B2 * | 7/2015 | Jogand-Coulomb ... G06F 21/10 |
| 2004/0068746 | A1 * | 4/2004 | Mori et al. ....................... 725/88 |
| 2005/0021830 | A1 * | 1/2005 | Urzaiz et al. .................. 709/234 |
| 2008/0098446 | A1 * | 4/2008 | Seckin ................... H04L 12/185 725/114 |
| 2008/0191816 | A1 * | 8/2008 | Balachandran ......... H04L 47/10 333/24 R |
| 2010/0269044 | A1 * | 10/2010 | Ivanyi .................... G06Q 30/02 715/736 |
| 2011/0228859 | A1 * | 9/2011 | Sugimoto ............ H04N 19/159 375/240.27 |
| 2011/0296046 | A1 * | 12/2011 | Arya et al. .................... 709/231 |

* cited by examiner

*Primary Examiner* — Gregory Todd
(74) *Attorney, Agent, or Firm* — Locke Lord LLP; Scott D. Wofsy; Christopher J. Capelli

(57) ABSTRACT

A device includes a frame data analyzer that generates buffer increment data based on frame data sent from the media server to the media client and further based on acknowledgement data sent from the media client to the media server. A playback data generator generates playback data based on frame data buffer contents and further based on player state data. A frame buffer model generator generates a buffer fullness indicator and the frame data buffer contents, based on the buffer increment data and the playback data. A player state generator generates the player state data, based on the buffer fullness indicator and further based on media client data, media server data and player command data.

23 Claims, 14 Drawing Sheets

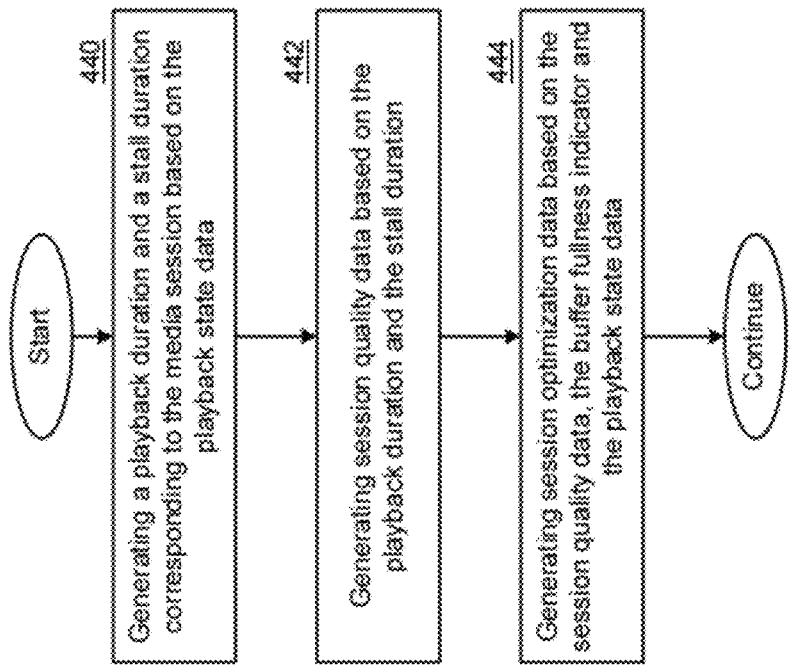
FIG. 17
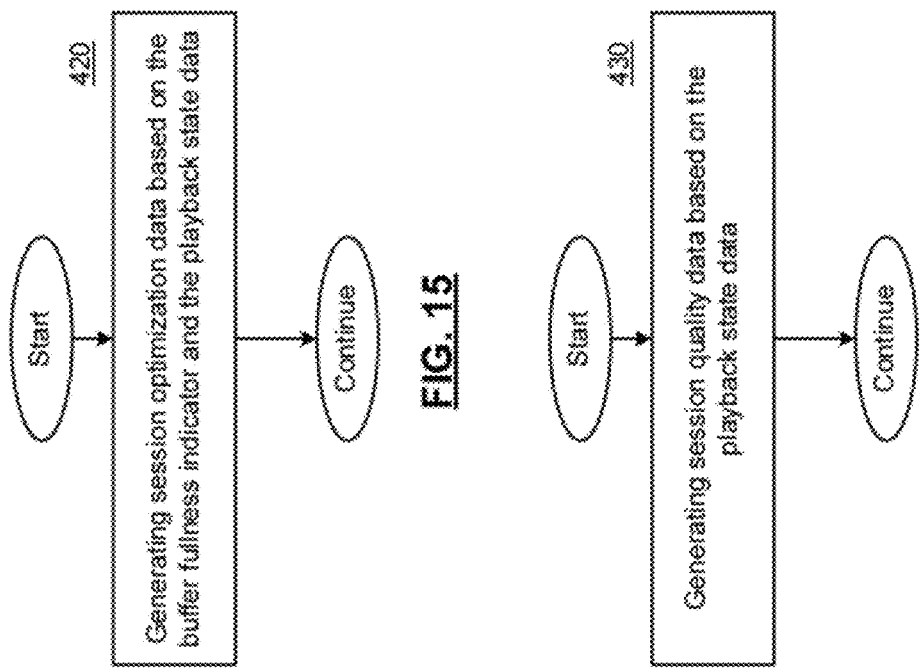
FIG. 15
FIG. 16

DEVICE WITH VIDEO BUFFER MODELING AND METHODS FOR USE THEREWITH

CROSS REFERENCE TO RELATED APPLICATIONS

This application claims priority under 35 USC section 120 as a continuation in part of the copending application entitled, DEVICE WITH VIDEO BUFFER MODELING AND METHODS FOR USE THEREWITH, having Ser. No. 13/053,650, filed on Mar. 22, 2011, and further claims priority under 35 USC section 119 to Provisional Application No. 61/407,531, filed Oct. 28, 2010, the contents of which are hereby incorporated by reference in their entirety.

TECHNICAL FIELD OF THE INVENTION

The present invention relates to network monitoring and particularly in conjunction with video distribution in mobile networks and other networks.

DESCRIPTION OF RELATED ART

Streaming media sent over various computer networks is increasingly popular. Maintaining such streaming is becoming a problem for the organizations providing and maintaining such networks. Streaming media has become an integral element of the "internet" experience through the significant availability of content from sites like YouTube, Netflix and many others. Streaming media content poses a significant load for the organizations that provide the networks for such content to be delivered. The companies that provide the networks, and also the content producers and distributors are limited in their ability to gauge the satisfaction of the end user. This is based in part, not only on the condition of the network, but the wide variety of different devices that can be used to access streaming media via a network.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 15 is a diagram illustrating a method in accordance with an embodiment of the present invention.

FIG. 16 is a diagram illustrating a method in accordance with an embodiment of the present invention.

FIG. 17 is a diagram illustrating a method in accordance with an embodiment of the present invention.

Figure 1:
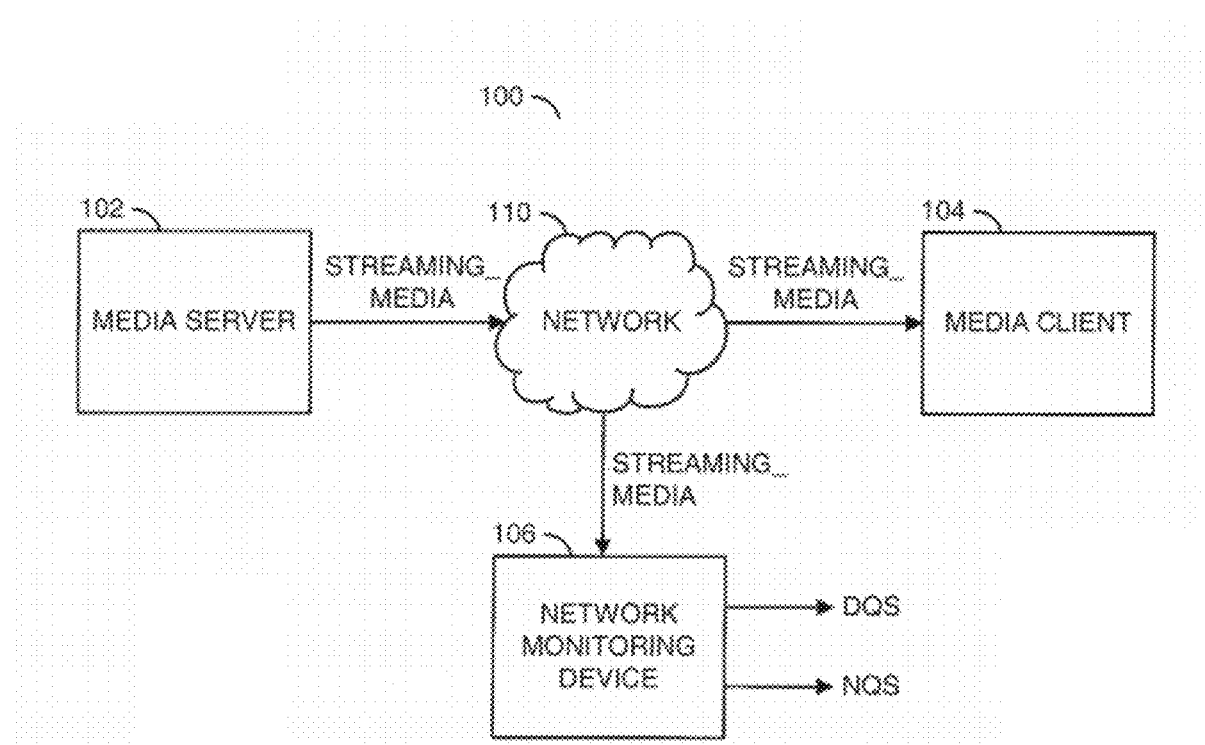
FIG. 1 is a diagram illustrating a system in accordance with an embodiment of the present invention.

DETAILED DESCRIPTION OF THE INVENTION INCLUDING THE PRESENTLY PREFERRED EMBODIMENTS

The present invention may be used in conjunction with a method and/or apparatus to estimate the impact of the delivery network on Quality of Experience (QoE) of media sessions or to detect and report significant playback events (e.g. stalling/re-buffering) and statistics (e.g. average/maximum client buffer fullness, duration of video streamed or played). The statistics on streamed and watched duration of video may be used to analyze viewing behavior. Quality of Experience may be a subjective term used to describe how well a user is satisfied with a video presentation. A Quality of Experience score may be based on actual viewing of a media session. Such a score may be calculated based on playback events during the viewing experience, such as re-buffering events. A model of viewer satisfaction may be used in the estimation. This model may map a set of video buffer state events to a level of subjective satisfaction (DQS) for a media session. The user model may be based on a memory model. An objective session model may map a set of hypothetical video buffer state events to an objective score (NQS) for a media session.

The present invention may also be used in conjunction with a method and/or apparatus for managing video traffic in a network. Specifically, the invention may provide input that is used manage the amount of forward data in a client buffer. Video streaming technologies generally depend on the source server (and network) to deliver some amount of forward video data to provide uninterrupted playback to the client. In some cases, it may be desirable to manage that data, to ensure a certain minimum or maximum data in the buffer, in order to optimize the utilization of network resources and viewer experience.

The present invention applies to video streaming services over a reliable transport protocol such as Transmission Control Protocol (TCP). In order for such services to provide a good quality of experience in streaming video, the content should be delivered in real-time or faster. That is to say, the video data should be sent at the same rate (or faster) than required to sustain real-time playback. When the content is streamed faster than the playback rate, video data accumulates in the client's buffer. This buffering helps prevent playback interruptions such as stalling and can compensate for changes in network throughput. With sufficient network throughput, a client receives the video data at a faster rate than playback. Therefore, brief outages or reductions in throughput can be tolerated without impacting QoE, as long as the buffer stays full. However during times of congestion or poor connectivity, the video buffer may become empty which will result in stalling and therefore poor QoE.

A media player initiates a video streaming session by sending a request for content to a server and begins in the Buffer Initialization state prior to starting playback. The server sends media data, filling the client's buffer with enough video data (frames) to provide some minimum amount of uninterrupted playback. Once enough data is accumulated, playback commences. During the Playback state, the client buffer is simultaneously being filled (data arriving via the network) and drained (data consumed via playback). Based on the difference between the fill and drain rates, the client buffer fullness increases or decreases over time.

Over time, if the drain rate exceeds the fill rate due to insufficient network throughput, the client buffer may empty completely, causing playback to stall. Stalls are the primary network impairments that subscribers observe in non-adaptive video streaming over a reliable transport protocol and the main cause of reduced quality of experience. Note that, in the Stall state, a player typically requires some meaningful amount of video data to accumulate in its buffer (similar to during the Buffer Initialization state) prior to resuming playback, so that some further minimum amount of uninterrupted playback can be provided.

With adaptive streaming protocols, the occurrence of stalls is reduced by the ability of the client and server to negotiate switching to a lower bit rate input stream in the face of reduced bandwidth. This requires that multiple versions of the input content are available on the streaming server at various bit rates. With such streaming protocols, small segments of the video are requested and sent in independent network flows. The media client serializes the data that is received across multiple segments and flows. In some cases, data that overlaps in playback time may be sent (same content sent at two different quality levels), in which case, the media client filters out all but one version of the content, which is played.

For both adaptive and non-adaptive protocols, when a viewer changes the playback position within the clip, a media client issues a new request to the server, and typically will discard previously buffered content and enter a Buffer Initialization state, as after the initial request. Similarly, transitioning to the Playback state requires sufficient media data to accumulate in the buffer to guarantee some minimal amount of continuous playback. The request and response that are initiated by a user seek typically occur in a newly created network flow.

Referring to FIG. 1, a block diagram of a system 100 is shown in accordance with a preferred embodiment of the present invention. The system 100 illustrates an example of a high level overview of an implementation of the present invention. The system 100 generally comprises a block (or circuit) 102, a block (or circuit) 104 and a block (or circuit) 106. The circuit 102 may be implemented as a media server. The circuit 104 may be implemented as a media client (or media player). The circuit 106 may be implemented as a monitoring device. The circuit 102 may present media content (e.g., a signal STREAMING_MEDIA) through a network 110. The network 110 may be implemented as a delivery network comprising numerous complex and/or interconnected hardware and/or software systems through which streaming media travels. The signal STREAMING_MEDIA may be presented to both the media client 104 and the network monitoring device 106. QoE estimation may be implemented in the network monitoring device 106 as media sessions (e.g., STREAMING_MEDIA) moving through the network 110 are monitored. The monitoring device 106 may be implemented in hardware, software or a combination of hardware and/or software. In one example, the monitoring device 106 may monitor traffic in Internet Protocol (IP) networks. However, the particular type of network may be varied to meet the design criteria of a particular implementation. While the monitoring device 106 is shown connected to the network 110, the monitoring device 106 may also be connected directly at the media server 102 or the media client 104.

The monitoring device 106 may inspect all packets on network interfaces (e.g., the media client 104) being monitored. The monitoring device 106 may look for media sessions on the network 110. Once a media session is detected, the state of the media client 104 is generally estimated for the purpose of QoE estimation. The state information is based on how and when a particular session is started and how the media is delivered over the network 110. The state information may then be used to either compute an estimate of a subjective delivery quality score (e.g., DQS) or an objective network quality score (e.g., NQS). The state information and intermediate signals may also be analyzed and reported directly to generate a report of key performance indicators (KPIs) for video streaming on the network. Examples of statistics that may be reported include the number, frequency and duration of re-buffering events, buffer fullness measures, such as average, minimum and maximum values over various intervals, and durations of video downloaded/streamed and played/watched.

Figure 2:
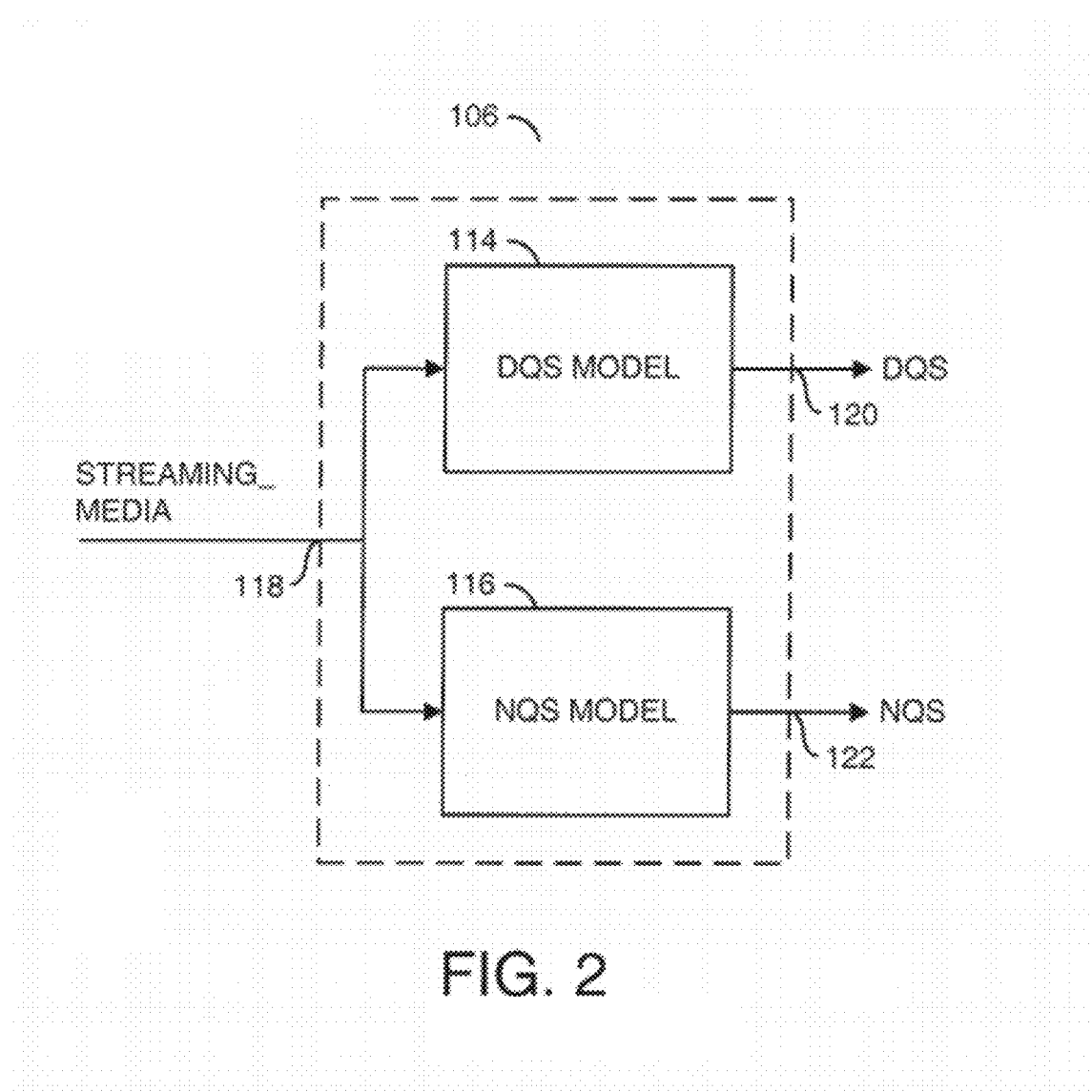
FIG. 2 is a diagram of a monitoring device in accordance with an embodiment of the present invention.

Referring to FIG. 2, a diagram of the device 106 is shown. The device 106 generally comprises a block (or circuit) 114, and a block (or circuit) 116. The block 114 may be implemented as a DQS model. The block 116 may be implemented as an NQS model. The device 106 may have an input 118 that may receive the signal STREAMING_MEDIA, an output 120 that may present the signal DQS and an output 122 that may present the signal NQS. The signal DQS may be in a first format (e.g., as MOS range of 1 to 5), while the signal NQS may be in a second format (e.g., as a percentage). The device 106 may generate the signal DQS and the signal NQS in response to the signal STREAMING_MEDIA. The monitoring device may generate the signal DQS individually, the signal NQS individually, or a combination of the signal DQS and the signal NQS. The signal DQS and/or the signal NQS may be considered as signals expressing the impact of the delivery network on the end user quality of experience (e.g., quality of experience signal).

Figure 3:
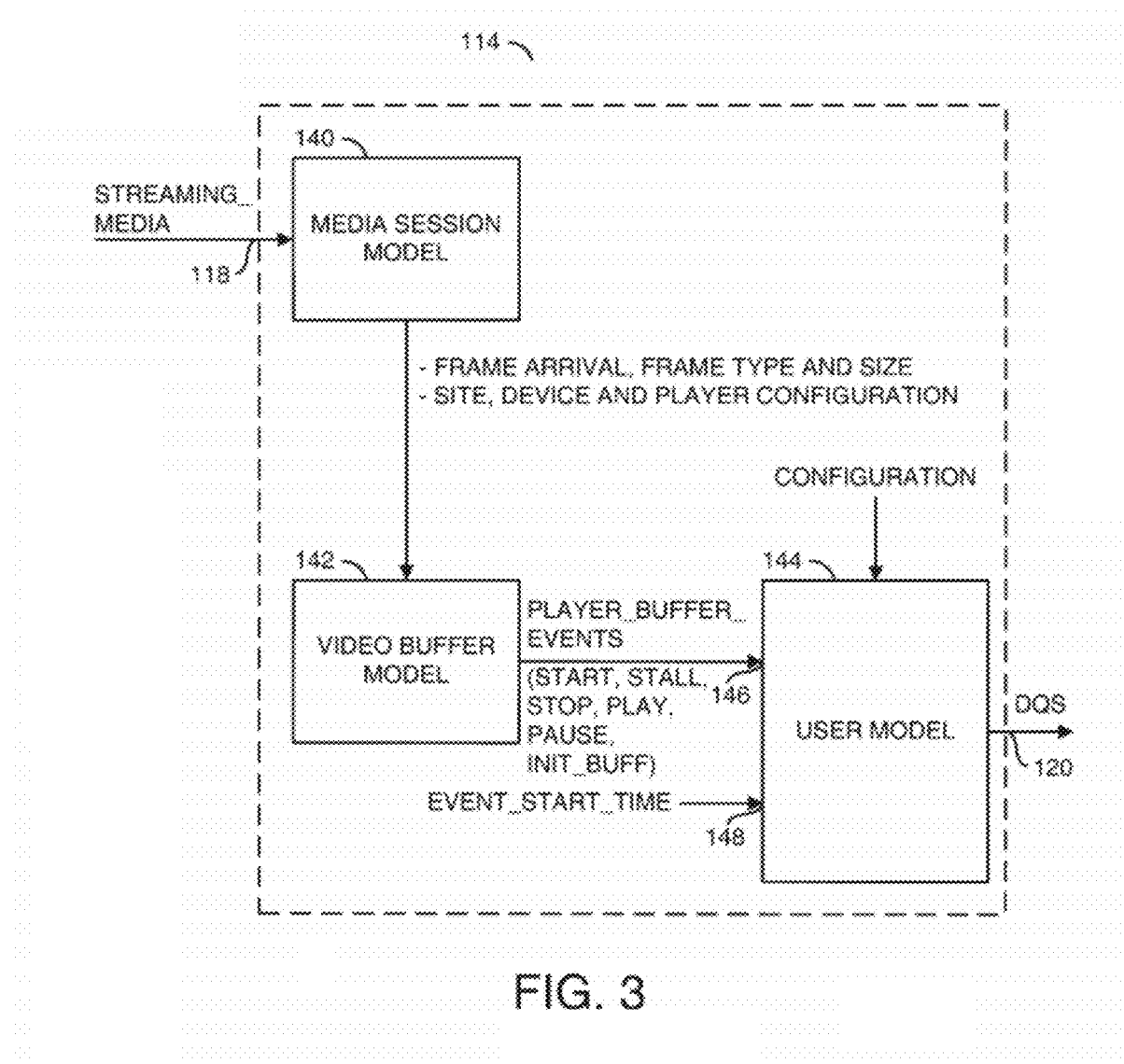
FIG. 3 is a diagram illustrating a data path of the generation of a subjective quality signal; in accordance with an embodiment of the present invention.

Referring to FIG. 3, a more detailed description of the block 114 generating a DQS data flow is shown. In one example, the block 106 is presented for the reliable transport (TCP) use case. The block 106 generally comprises a block (or circuit) 140, a block (or circuit) 142 and a block (or circuit) 144. The block 140 may be implemented as a media session model. The block 142 may be implemented as a video buffer model. The block 144 may be implemented as a user model. The block 140, the block 142, and the block 144 may be implemented as hardware, software, or a combination of hardware and/or software. The block 114 may have an input 118 that may receive the signal STREAMING_MEDIA and an output 120 that may present the signal DQS. The block 144 may have an input 146 that may receive a signal (e.g., PLAYER_BUFFER_EVENTS), an input 148 that may receive a signal (e.g., EVENT_START_TIME) and an output 120 that may present the signal DQS.

The media session model 140 may (i) assemble the network traffic (e.g., packets), (ii) track frame arrivals at the media client 104, (iii) detect site, device, player information and/or the start and end of media sessions and/or (iv) detect audio and/or video frames, including frame type and/or frame size.

The video buffer model 142 may use all or part of the information from the media session model 140 to estimate the state of the media client 104. The estimation may be presented as an event indicator in the signal PLAYER_BUFFER_EVENTS. The events may include, but are not limited to, an INITIATE event, a STALL event, a STOP event, a PLAY event, a PAUSE event and a SEEK event. The state (event) information may then be used by the user model 144 to compute a value for the signal DQS. The signal DQS may be a unique signal that may be computed for each media session. The value of the signal DQS may be sampled throughout the media session. A value of the signal DQS may then be stored to an external system (e.g., a memory or other storage device—not shown).

The user model 144 may compute a subjective quality score that may be an estimation of a user experience of streaming media as affected by perceivable transmission impairments. The signal DQS may be an estimate of a subjective score based on input from the video buffer model 142. The subjective score may be an estimate of an actual video buffer within the media client device 104. It may be desirable to have an objective score in addition to a subjective score. The block 116 may compute an objective score signal NQS (to be described in more detail in FIG. 6).

Figure 4:
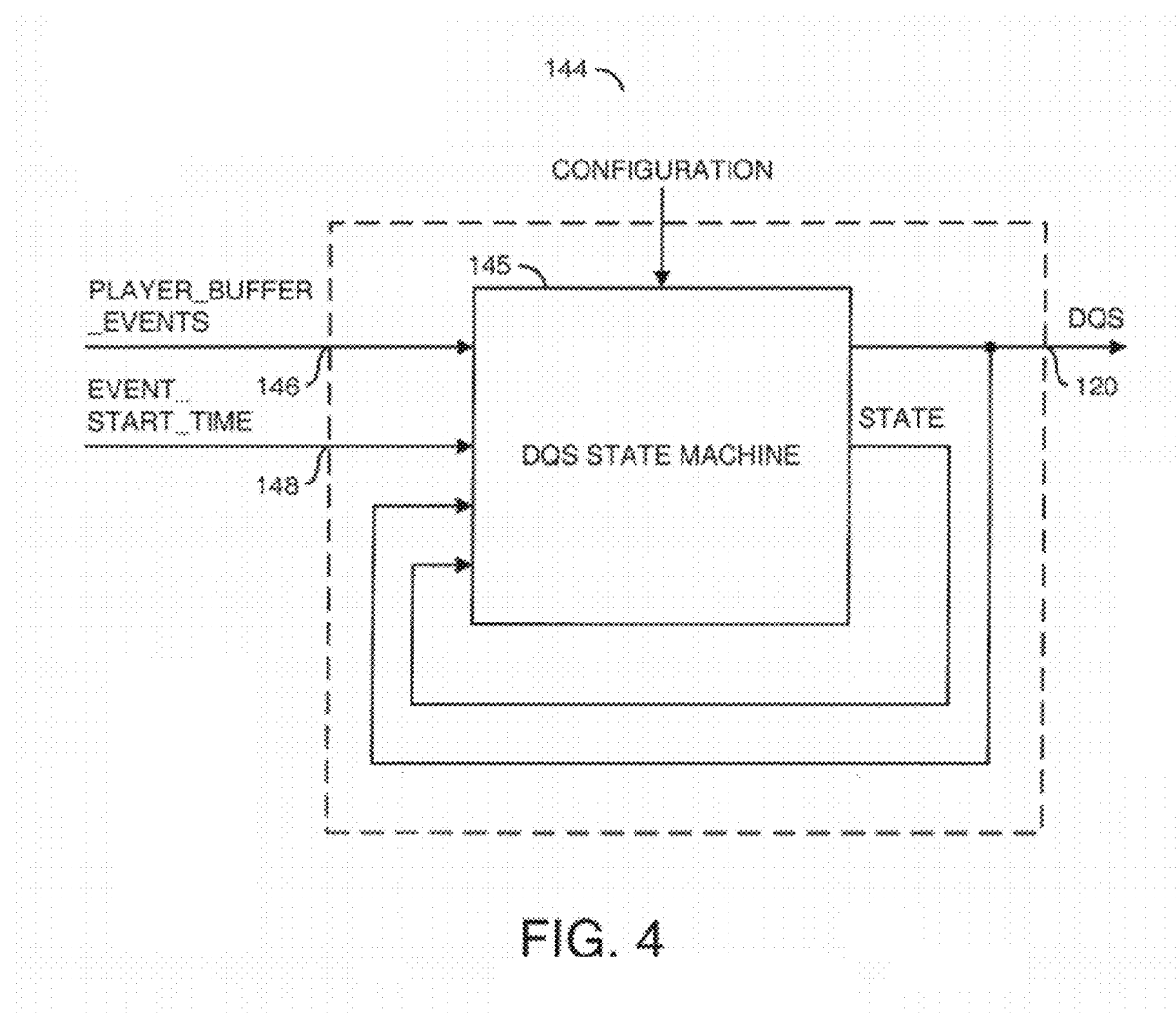
FIG. 4 is a diagram of an example of the user model in accordance with an embodiment of the present invention.

Referring to FIG. 4, a diagram of an example of the user model 144 is shown. The user model 144 may include a state machine 145. The state machine 145 may generate the signal DQS in response to the signal PLAYER_BUFFER_EVENTS, and the signal EVENT_START_TIME. The state machine 145 may generate a signal STATE that may be presented as a feedback. The signal STATE may indicate a current state of the state machine 145. The signal DQS may also be presented as a feedback. The state machine 145 may adjust the current value in the signal DQS based on the previous value feedback in the signal DQS.

Figure 5:
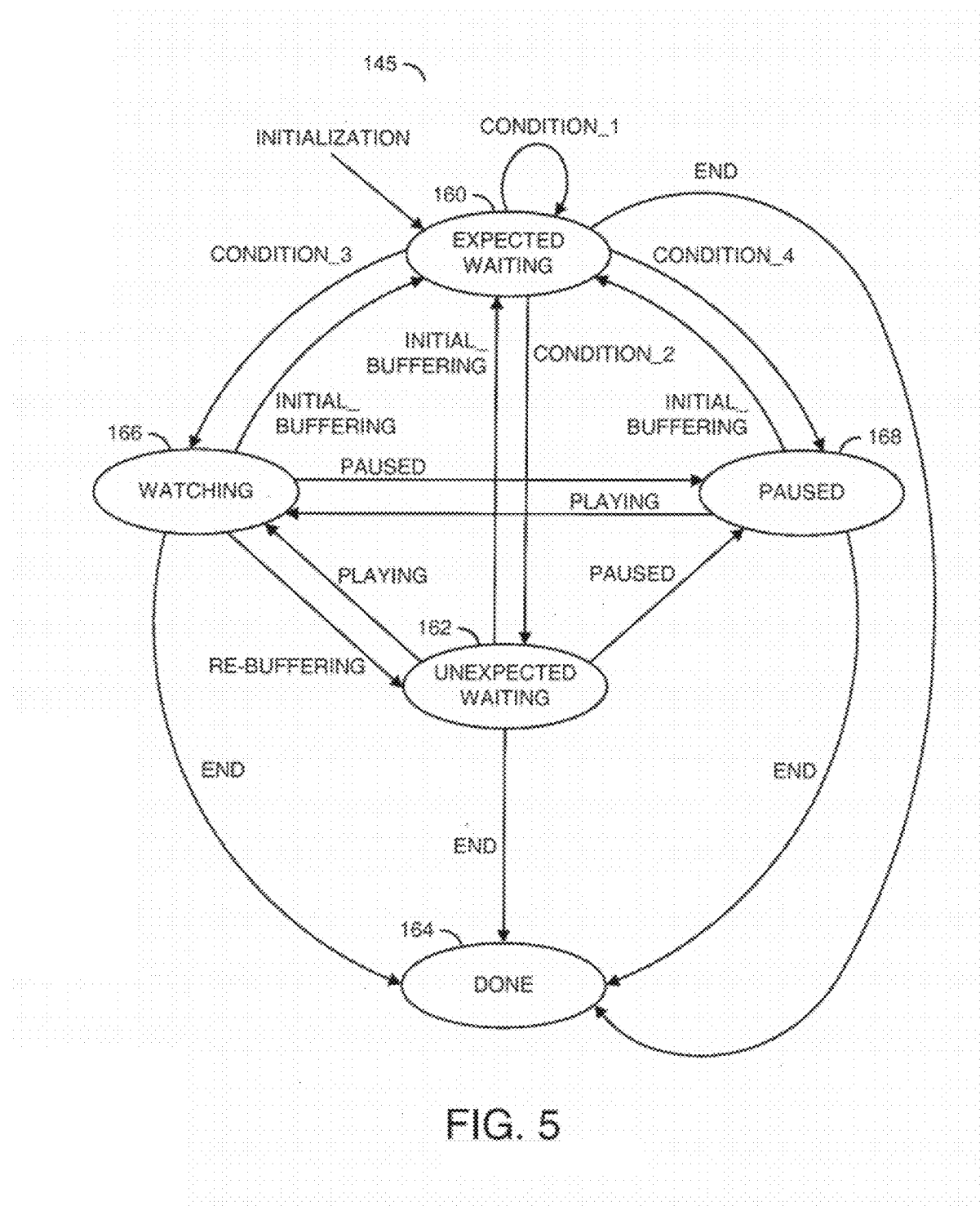
FIG. 5 is a diagram of a state machine implementation of the user model in accordance with an embodiment of the present invention.

Referring to FIG. 5, a state diagram of the state machine 145 is shown. The state machine 145 generally comprises a state (or step) 160, a state (or step) 162, a state (or step) 164, a state (or step) 166 and a state (or step) 168. The state 160 may be used as an expected waiting for playback state. The state 162 may be an unexpected waiting state. The state 164 may be a complete (or done) state. The state 166 may be a watching state. The state 168 may be a paused state. The states 160 to 168 may be implemented as hardware, software, or a combination of hardware and/or software. The state machine 145 may update periodically (e.g., once per second) or may be updated based on events. At each of the updates, the state machine 145 may or may not change states depending upon the current state and the information received in the signals PLAYER_BUFFER_EVENTS and EVENT_START_TIME. The state machine 145 may also update a satisfaction value (or level) in the signal DQS at each update.

The state machine 145 may initialize to the state 160 upon assertion of the signal EVENT_START_TIME. The assertion of the signal EVENT_START_TIME generally indicates that streaming of a media program has begun. The user normally expects that an initial delay (e.g., 3 seconds or less) may be experienced between the beginning of the stream and the appearance of the video and/or audio from the media client device 104.

While the state machine 145 is in the state 160, an initial buffering of the video and/or audio as received from the network 110 generally takes place in the media client device 104. The buffering may be modeled by the video buffer model 142. Since the user expects the initial buffering delay, user satisfaction may remain unaltered by the state machine 145. The satisfaction value in the signal DQS may remain unaltered at a current value by the state machine 145. A high satisfaction value (e.g., 5) generally means that the quality of the delivery is permitting a satisfactory experience for the user. A low satisfaction value (e.g., 1) may indicate that the quality of the delivery is causing an unsatisfactory experience for the user.

A condition (e.g., CONDITION_1) may occur if the state machine 145 cycles while in the state 160, the initial buffering is still in progress, and less than the full initial buffering delay has elapsed since the signal EVENT_START_TIME was asserted. The CONDITION_1 generally leaves the state machine 145 in the state 160 to continue the initial buffering. The state machine 145 may leave the signal DQS unchanged by the CONDITION_1.

A condition (e.g., CONDITION_2) may occur if the state machine cycles while in the state 160, the initial buffering is still in progress, and the user has waited for the entire initial buffering delay (e.g., waited more than X seconds). Occurrence of the CONDITION_2 generally causes the state machine 145 to transition from the state 160 to the state 162. In the state 162, the buffering may continue. The continuing delay may be perceived by the user as an unexpected delay. Therefore, the state machine 145 may reduce the satisfaction value in the signal DQS over time while in the state 162. Changing the satisfaction value in the signal DQS is generally described in more detail below.

When in state 160, a condition (e.g., CONDITION_3) may occur if the initial buffering has finished within the initial delay time (e.g., ≤X seconds) and the signal PLAYER_BUFFER_EVENTS indicates that the media program has started playing (e.g., the Initiate event and/or the PLAY event). The CONDITION_3 generally causes the state machine 145 to transition from the state 160 to the state 166.

The state 166 may indicate that the user is experiencing (e.g., watching) the media program. Therefore, the state machine 145 may maintain or increase the satisfaction value in the signal DQS.

When in state 160, a condition (e.g., CONDITION_4) may occur if the initial buffering has finished within the initial delay time and the signal PLAYER_BUFFER_EVENTS indicates that the media program has been paused (e.g., the PAUSE event) by the user. The CONDITION_4 generally causes the state machine 145 to transition from the state 160 to the state 168. The state 168 generally means that the media program is currently paused. Since the user initiated the pause, the state machine 145 may hold the satisfaction value unchanged as long as the state machine 145 is in the state 168.

While in the state 168, the user may resume playback of the media program. The resumption may be indicated in the signal PLAYER_BUFFER_EVENTS (e.g., the Initiate event and/or the PLAY event) by the video buffer model 142. The state machine 145 may respond to the resumed playback condition (e.g., PLAYING) by transitioning from the state 168 to the state 166.

While in the state 166, the video buffer model 142 may indicate that all of the content of the media program previously received from the network 110 has been read from the buffer (e.g., a stall in the playback). The video buffer model 142 may indicate the stall to the state machine 145 in the signal PLAYER_BUFFER_EVENTS (e.g., the STALL event). The state machine 145 generally treats the stall event as a condition (e.g., RE-BUFFERING). From the state 166, the state machine 145 may transition to the state 162 in response to the condition RE-BUFFERING. The user may perceive the stall in the playback as an unexpected delay. Therefore, the state machine 145 may decrease the satisfaction value in the signal DQS while in the state 162.

Once the video buffer model 142 indicates that a sufficient amount of content has been received from the network 110 to resume the playback, the video buffer model 142 generally informs the state machine 145 via the signal PLAYER_BUFFER_EVENTS (e.g., the Initiate event). From the state 162, the state machine 145 may consider the reception of the Initiate event as the condition PLAYING. As such, the state machine 145 may transition from the state 162 to the state 166 at the next state machine cycle.

If the user pauses the playback while the state machine 145 is in either the state 166 or the state 162, the condition PAUSE may exist. At the next state machine cycle, the state machine 145 may transition from the state 162 or 166 to the state 168. If sufficient content is buffered when the media program resumes playback, the state machine 145 may transition from the state 168 to the state 166. If insufficient content is buffered when the media program resumes playback, the resulting delay may be perceived by the user as a normal buffering delay. Therefore, the state machine 145 may transition from the state 168 to the state 160.

If the user temporally jumps forward or backward in the playback of the media program, the video buffer model 142 may indicate the jump in the signal PLAYER_BUFFER_EVENTS (e.g., the INITIAL_BUFFERING event). If the seek is sufficiently forward or backwards in time, the content being sought may not be currently buffered. A delay may result while the requested content at the seek point is obtained from the media server 102. The seek delay may be perceived by the user as a normal delay. When the event INITIAL_BUFFERING is asserted, the state machine 145 may transition from any of the states 162, 166 and 168 back to the state 160 when cycled.

If the media program reaches an end, or the user intentionally stops the playback, the video buffer model 142 may inform the state machine 145 in the signal PLAYER_BUFFER_EVENTS (e.g., the STOP event). The state machine 145 may view the STOP event as the assertion of a condition (e.g., END). When the condition END is asserted, the state machine 145 may transition from any of the states 160, 162, 166 and 168 to the state 164. While in the state 164, the state machine 145 may hold the DQS value unchanged.

Figure 6:
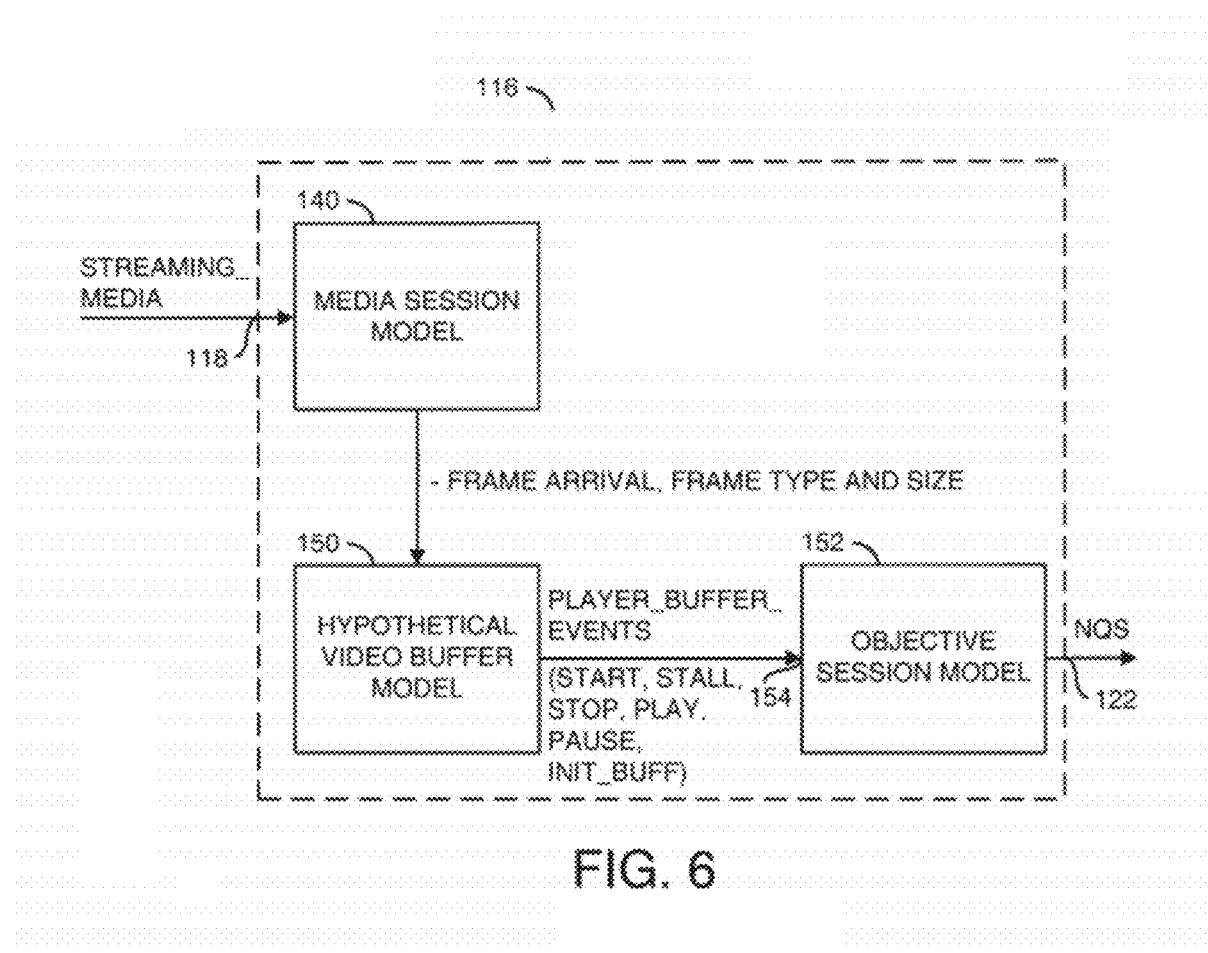
FIG. 6 is a diagram illustrating a data path of the generation of an objective quality signal in accordance with an embodiment of the present invention.

Referring to FIG. 6, a more detailed description of the block 116 generating a data flow for generating the signal NQS is shown. The block 116 generally comprises the block 140, a block (or circuit) 150 and a block (or circuit) 152. The block 150 may be implemented as a hypothetical video buffer model. The block 152 may be implemented as an objective session model. The block 116 may have an input 118 that may receive the signal STREAMING_MEDIA and an output 122 that may present the signal NQS. The block 152 may have an input 154 that may receive the signal PLAYER_BUFFER_EVENTS and an output 122 that may present the signal NQS.

The generation of the signal NQS normally depends on many of the same inputs as the generation of the signal DQS, which may be computed by the media session model 140. The main difference between generating the signal DQS and the signal NQS is the implementation of the video buffer model 142 and the score calculation. The generation of the signal NQS may employ a hypothetical video buffer model 150, which no longer models a specific site, device, or player, but assumes a generalized greedy client. A greedy client may be defined as a client that displays a frame as soon as such a frame is delivered over the network 106. The state of the client 104 (as estimated by the hypothetical buffer model 150) may then be used by an objective session model which may calculate a score (e.g., from 0 to 100) as the signal NQS. A signal NQS may be a unique signal calculated for each media session. The value of the signal NQS may be sampled throughout the session and may be stored to an external system.

The hypothetical video buffer model 150 may be similar to the video buffer model 142 described in connection with FIG. 2. The model 150 may estimate the state of a generalized greedy client for a given media session. This imposes a tighter real-time delivery bound which may expose any deficiencies in the ability of the network 110 to deliver the media session in real time. To do this, various parameters in the video buffer model 150 may be set to the most aggressive values. The video buffer 150 may be filled at the network rate and emptied at the play rate. However, once the video buffer 150 is drained, the first frame to be removed is generally removed as soon as the first frame arrives. The hypothetical video buffer model 150 is normally a greedy buffer model. A greedy buffer model 150 may be consistent for all media sessions and may allow the calculation of a normalized score and a more objective score.

The network monitoring device 106 may be implemented as a hardware and/or software system. The device 106 may implement media session modeling. The relevant models and/or interactions have been highlighted in the previous section. In this section, various models used to compute delivery QoE are described in further detail. The various models include (i) a video buffer model, (ii) a hypothetical video buffer model, (iii) a user model, and/or (iv) an objective session model.

Figure 7:
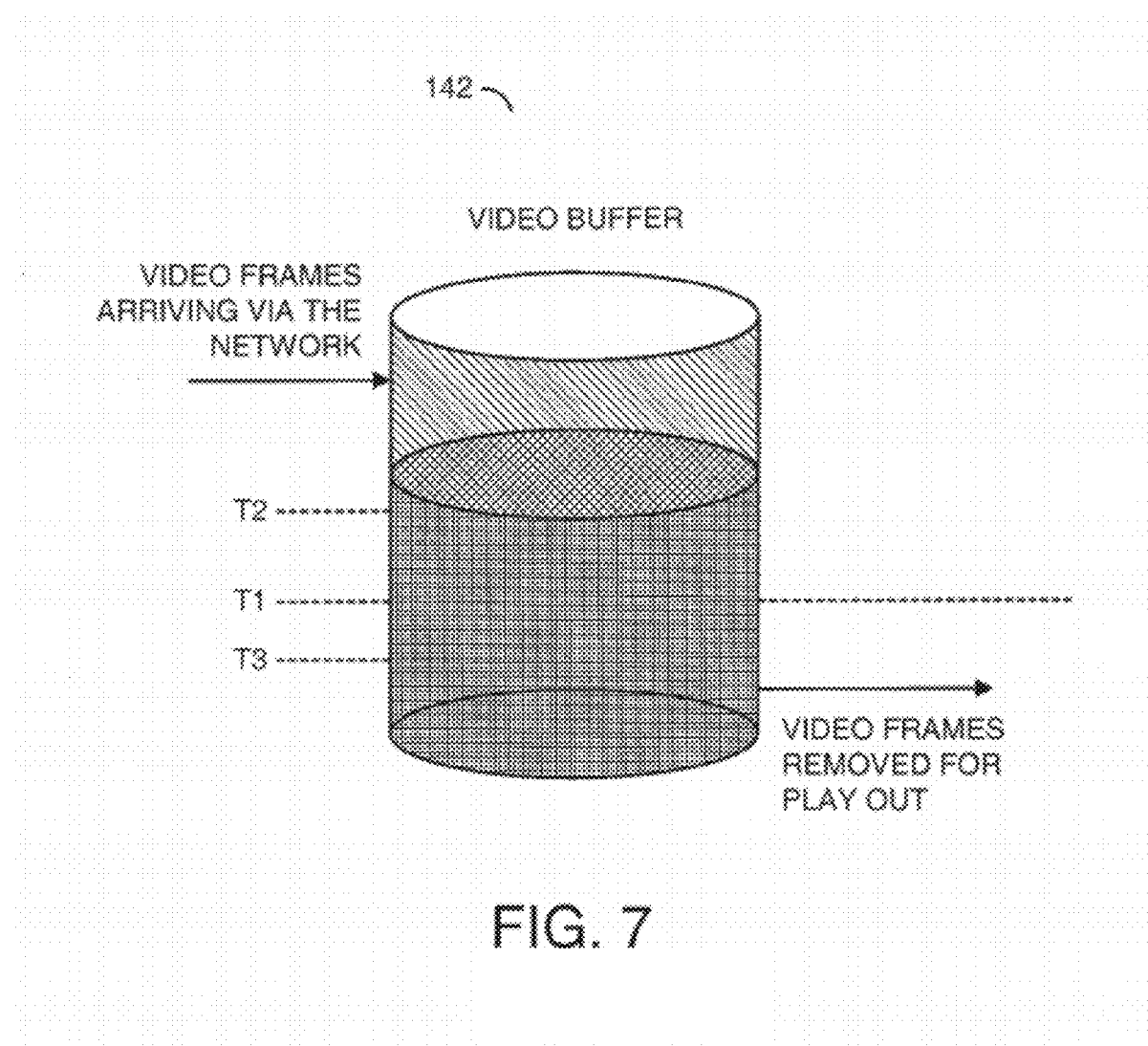
FIG. 7 is a diagram illustrating a video buffer in accordance with an embodiment of the present invention.

Referring to FIG. 7, an illustration of the video buffer model 142 is shown. The video buffer model 142 may be implemented having a threshold T1, a threshold T2 and a threshold T3. The video buffer model 142 may estimate the state of the client 104 video buffer for a given media session. The video buffer model 142 may be implemented as a video frame queue where frames are inserted at the rate at which they arrive at the client device 104 over the network 110. The frames may be removed in a decode order at a video play rate (e.g., 24 frames per second, etc.). There are typically several unique and/or possibly dynamically changing thresholds that may be web site, device and/or player dependent. In one example, a threshold may be the amount of playback time represented by the frames in the buffer T1 that is needed in the video buffer 142 before the first video frame is removed and played at the beginning of the media session. In another example, the threshold may be the amount of playback time represented by the frames in the buffer T2 that is needed in the video buffer 142 before the first video frame is removed and played after the video buffer 142 has run empty causing the playback to stall. In another example, the buffer T3 may reach a threshold that may represent a certain minimum amount of playback time represented by the frames in the video buffer 142 that need to be maintained, where falling below this threshold may cause the media player 104 to stall.

For media sessions that are transmitted over a reliable network layer such as TCP, the only perceivable impairments due to the network are re-buffering events and/or quality changes. This is due to the fact that all video frames are guaranteed to arrive for active connections. However, the arrival time may be significantly delayed and may cause the media client 104 to drain the video buffer 142 and may cause a re-buffering event. These re-buffering events are estimated by the video buffer model 142.

For media sessions that are transmitted over an unreliable network layer (e.g., UDP) the perceivable impairments due to the network 110 are more numerous. For example, some frames or portions of frames may not arrive at the media client 104. The types of perceivable impairments may include break-up, re-buffering, skipping and/or out of sync audio/video transmissions. For a break-up, once a decoder in the media client 104 does not receive a frame or part of a frame, the media client 104 may start using incorrect reference data producing artifacts. This typically corrects itself every IDR frame. For re-buffering, the media client 104 may attempt to buffer video before resuming playback. This is particularly useful if transmission is slower than real time due to jitter and/or congestion. Skipping causes unintentional video and/or audio jumps. Out of sync transmissions occur when video and/or audio get out of sync. Combinations of the perceivable impairments listed above may also occur.

In one example, the user model 144 for media sessions transmitted over a TCP network may be considered. The user model 144 normally receives the state of the video buffer model 142 as an input, and generates a score in a MOS scale.

Figure 8:
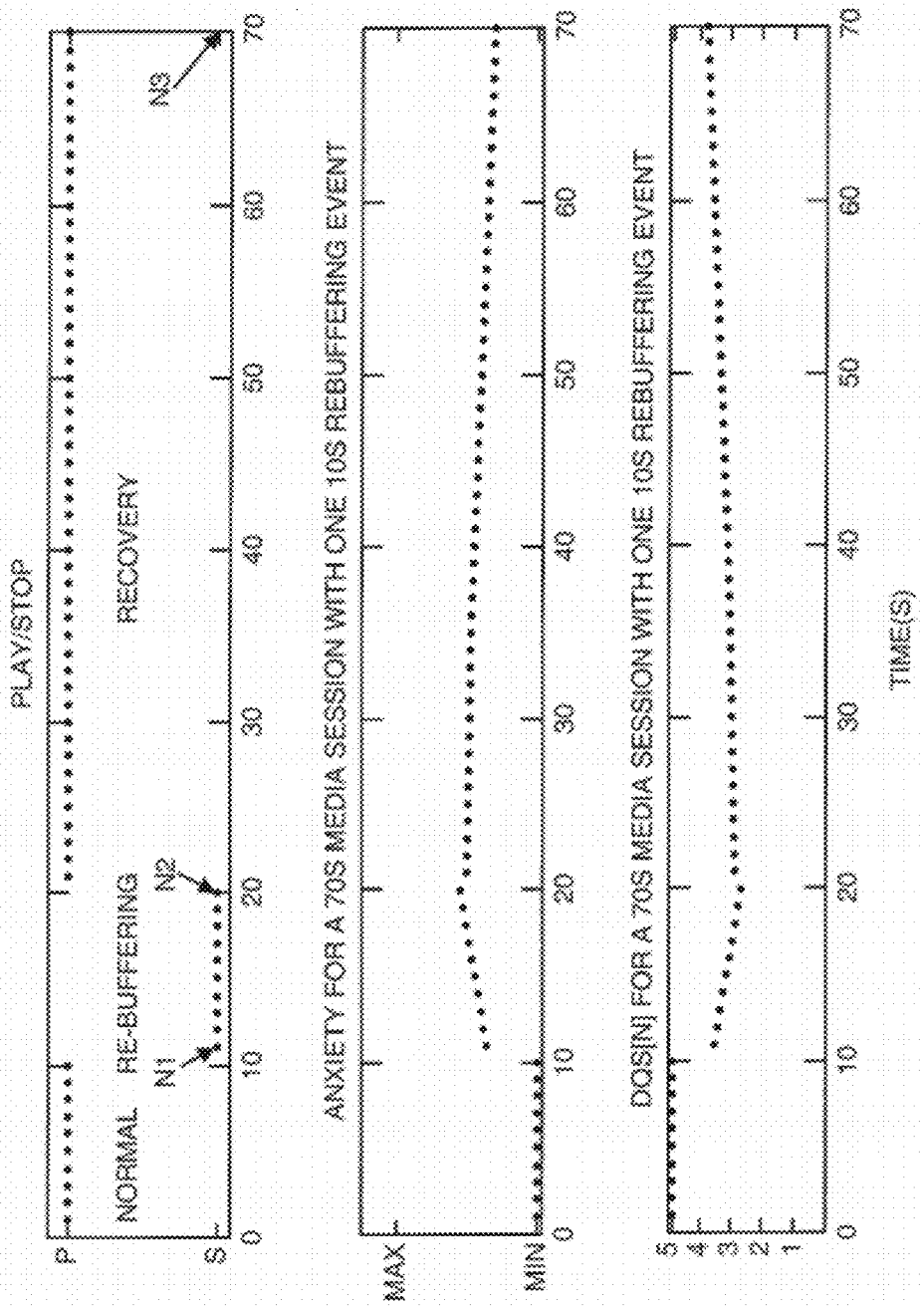
FIG. 8 is a diagram illustrating a number of graphs implementing a user model in accordance with an embodiment of the present invention.

In FIG. 8, a 70 second long media session is partitioned into three regions (top graph of FIG. 8). The "P" and "S" on the y-axis normally represent the state of the video buffer model, either playing or stopped (re-buffering). For each of these regions there is a corresponding level of dissatisfaction (middle graph of FIG. 8). In the "Normal" region, dissatisfaction is at its lowest, since everything is working normally. In the "Re-buffering" region, a re-buffering event occurs which has the immediate impact of an abrupt increase in dissatisfaction and as the event continues the dissatisfaction continues to build. In the "Recovery" region, as playback resumes there is an abrupt decrease in dissatisfaction and the dissatisfaction continues to decrease as playback resumed. Note that in the recovery region while playback continues dissatisfaction continues to decrease, there is still the memory of the re-buffering event. The recovery section may be further divided into the initial, continued, and long lasting effects to be within range. In one example, the signal DQS may be computed by scaling the user dissatisfaction function to be within the range of 0 to 4, then subtracting the scaled result from 5. The signal DQS plotted over time for this example is shown in the bottom graph of FIG. 8.

The relationships shown in FIG. 8 can be expressed by the following equation:

$$Q[n] = \begin{cases} Q_1[n], & n < n_1; \\ Q_2[n], & n_1 \le n < n_2; \\ Q_3[n], & n_3 \le n < n_3; \end{cases} \quad \text{EQ1}$$

where n1, n2 and n3 are times of the re-buffering start, re-buffering end, and video duration respectively, and function Q [n] is the signal DQS. Q1 [n], Q2 [n] and Q3 [n] are the unique functions for each or the intervals, and may be further expressed by the following equation:

$$Q[n] = \begin{cases} 5, & 0 \le n \le n_1; \\ [Q[n_1-1] - (n-n_1) \cdot F_1[n] - F_2[n_1-1]], & n_1 \le n \le n_2; \\ [Q[n_2-1] + (n-n_2) \cdot F_3[n] + F_4[n_2-1]], & n_2 \le n \le n_3; \end{cases} \quad \text{EQ2}$$

where F2 [n] represents initial decrease in satisfaction, F1 [n] represents continued and growing dissatisfaction, F4 [n] represents initial increase in satisfaction and F3 [n] represents a continued and growing satisfaction. The function Q[n] is clamped to be within the desired range of 1 to 5.

On average a viewer does not experience the same initial dissatisfaction for all re-buffering events. Similarly, dissatisfaction does not build the same way for the all re-buffering events. The same applies to the recovery. Before defining F1 [n], F2 [n], F3 [n], F4 [n], it is important to define vector n=(n1, n2, n3, n4 . . . ni, ni+1, ni+2). This vector is a list of times for which the video stops and starts (odd indexes indicate a re-buffering event start and even indexes indicate re-buffering event end). With the vector n defined, F2 [n] may be described by the following equation:

$$F_2[n] = \begin{cases} f_{2,1}, & \text{first re-buffering event}, n = n_1; \\ f_{2,3}, & \text{second re-buffering event}, n = n_3; \\ \vdots & \vdots \\ f_{2,i}, & k'th \text{ re-buffering event}, n = n_i; \end{cases} \quad \text{EQ3}$$

where f2,1, f2,3 and f2,i are constants. Using different constant for each event is most accurate. However, through experiments the biggest difference in initial dissatisfaction may be found to occur between the first and subsequent events. The initial dissatisfaction following the first re-buffering event is approximately constant. However, subsequent initial dissatisfaction increases are relative to dissatisfaction level just before the event. Therefore under most circumstances, dissatisfaction jump at the start of a re-buffering event may be approximated with the following equation:

$$F_2[n] = \begin{cases} f_2, & \text{first re-buffering event}, n = n_1; \\ f'_2 \cdot Q[n-1], & \text{for all other re-buffering events}; \end{cases} \quad \text{EQ4}$$

where $f_2$ and $f'_2$ are constants which may be tuned. Using similar reasoning, $F_1$ [n] and $F_4$ [n] may be expressed as:

$$F_1[n] = \begin{cases} f_1, & \text{during first re-buffering event}, n \le n_2; \\ f'_1, & \text{for all other re-buffering events}; \end{cases} \quad \text{EQ5}$$

$$F_4[n] = \begin{cases} f_4, & \text{first re-buffering event}, n = n_1; \\ f'_4 Q[n-1], & \text{for all other re-buffering events}; \end{cases} \quad \text{EQ6}$$

The recovery function F3 [n] is more complex. For a short duration media sessions, F3 [n] may be approximated as:

$$F_3[n] = \begin{cases} f_{3,I}, & \text{first } N \text{ sec after the first re-buffering event, } n_2 \le n_2 + N; \\ f_{3,C}, & \text{after } N \text{ sec after the first re-buffering event, } n_2 + N \le n < n_3; \\ f'_{3,I}, & \text{first } N \text{ sec after a subsequent re-buffering event, } n_{i+1} \le n \le n_{i+1} + N; \\ f'_{3,C}, & \text{after } N \text{ sec after a subsequent re-buffering event, } n_{i+1} + N \le n < n_{i+2}; \end{cases} \quad EQ7$$

where N≈15 sec. The subscripts I and C stand for initial and continued respectively. All of these equations may be rewritten as:

$$Q[n] = \begin{cases} 5, & 0 \le n < n_1; \\ [Q[n_1 - 1] - f_1 \cdot (n - n_1) - f_2], & n_1 \le n < n_2; \\ [Q[n_2 - 1] \cdot f_4^* + f_{3,I} \cdot (n - n_2)], & n_2 \le n < n_2 + N; \\ [Q[n_2 + N - 1] + f_{3,C} \cdot (n - n_2 - N)], & n_2 + N \le n < n_3; \\ [Q[n_i - 1] \cdot f_2'^* - f_1' \cdot (n - n_i)], & n_i \le n < n_{i+1}; \\ [Q[n_{i+1} - 1] \cdot f_4'^* + f'_{3,I} \cdot (n - n_{i+1})], & n_{i+1} \le n \le n_{i+1} + N; \\ [Q[n_{i+1} + N - 1] + f'_{3,C} \cdot (n - n_{i+1} - N)], & n_{i+1} + N \le n < n_{i+2}; \end{cases} \quad EQ8$$

where $f'2^* = 1 - f'2$, $f4^* = 1 + f4$ and $f'4^* = 1 + f4$.

While the equation EQ8 may provide an accurate calculation of the signal DQS for relatively short duration media sessions, the equation EQ8 may need to be adjusted for media sessions lasting tens or hundreds of minutes. This is due to the fact that F3 [n] produced a relatively fast recovery of the signal DQS. For example given f3,I≈0.01 and f3,C≈0.02, a full recovery of the signal DQS may occur completely within minutes, but that does not correlate as well to measured user satisfaction for long media sessions. Thus, it is necessary to limit how fast and by how much Q [n] is allowed to recover for long media sessions. This can be accomplished by introducing additional recovery regions.

The user model may account for the impact of (i) one or multiple re-buffering events, (ii) variable duration of single or multiple re-buffering events, (iii) variable location within the media session of single or multiple re-buffering events, (iv) variable media session duration and/or (v) variable start up delay. The user model may also provide adaptability to different content types and demographics (either dynamic or static). This may be accomplished by adjusting the various thresholds and rates.

The user model may be presented as a discrete function or a continuous function. The user model may provide a mapping of a video buffer model state to a level of user satisfaction based on a memory model supporting (i) all variations of detectable video buffer state events, (ii) all variations in media sessions durations and/or (iii) adaptability to content type and demographics.

The objective session model may calculate an objective measure of how the network delivered content to a media client and/or if the network was able to maintain real-time delivery throughout the session. The inputs into this model may comprise events generated by the hypothetical video buffer model. These inputs may be used to calculate how much a generalized and greedy media clients generally wait on the network 110 to deliver the media session.

The signal NQS may be calculated as the percentage of play duration divided by the play duration and stalled duration. Play duration may be the amount of time a hypothetical client was playing at the desired frame rate. Stalled duration may be the amount of time a hypothetical client was waiting for frames when the client should have been playing. This includes unexpected excess waiting during initial buffering.

The score can be sampled at any point where (play duration+stalled duration)>0 according to the following formula:

$$\text{Network Quality Score} = \frac{100 \cdot \text{play duration}}{\text{play duration} + \text{stalled duration}} \quad EQ9$$

In contrast to play duration and stalled duration, there may be other time intervals during a session which do not affect network quality score, such as the amount of time the player was paused and/or an expected portion of time spent waiting for frames during initial buffering.

The model of the present invention may map hypothetical video buffer state events to an objective score for delivery of streaming media over a reliable network. The model may also support all variations of hypothetical video buffer state events supporting all variations in media session durations.

Figure 9:
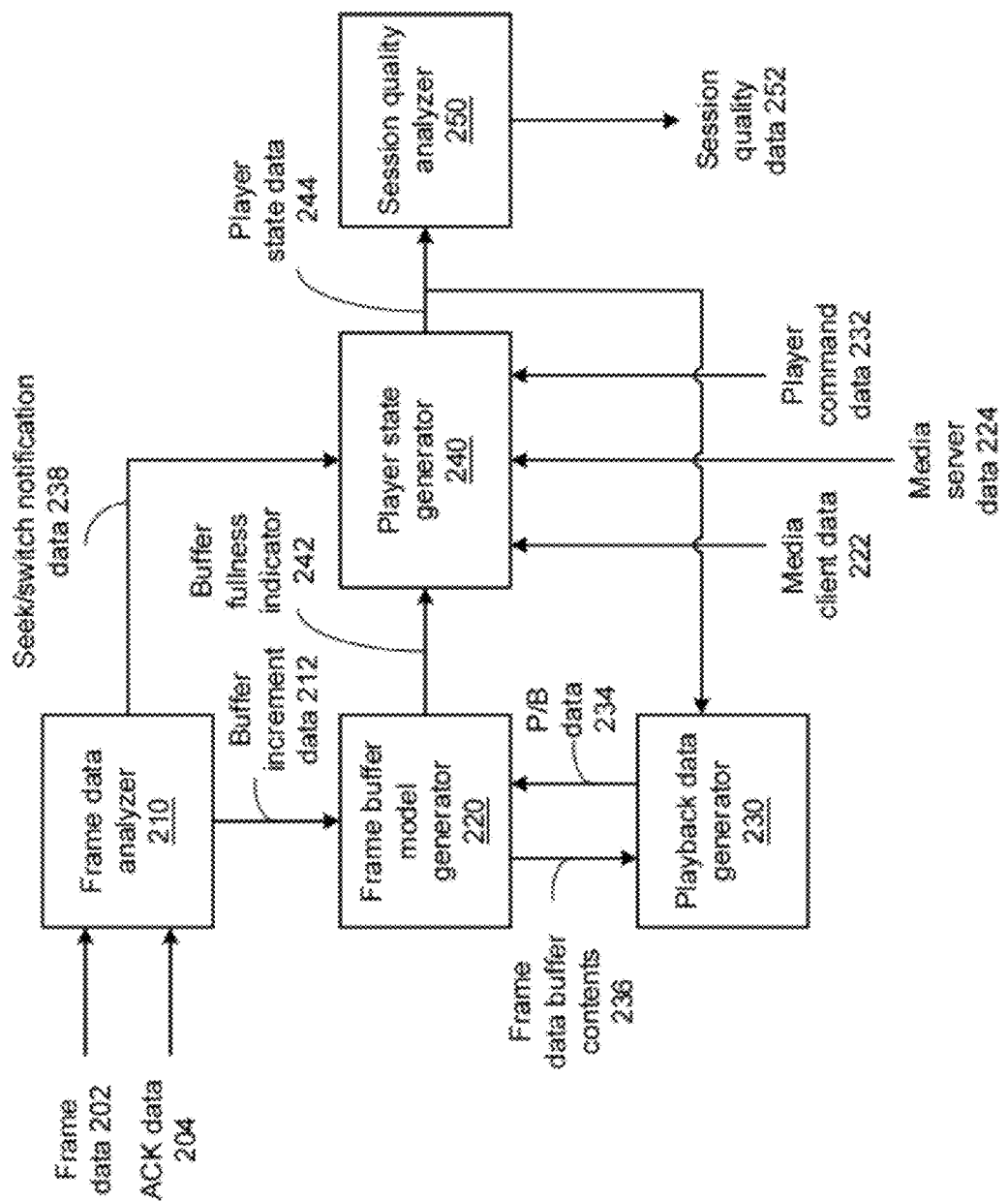
FIG. 9 is a diagram illustrating a device that includes a video buffer model in accordance with an embodiment of the present invention.

FIG. 9 is a diagram illustrating a video buffer model in accordance with an embodiment of the present invention. In particular, a device is shown as a further embodiment of video buffer model 142 or hypothetical video buffer model 150 for use in a network monitoring system that analyzes media session data communicated via a network between a media server and a media client. This device includes frame data analyzer 210, frame buffer model generator 220, playback data generator 230 and player state generator 240.

The frame data analyzer 210 generates buffer increment data based on frame data 202 sent from the media server to the media client and further based on acknowledgement data 204 sent from the media client to the media server. The playback data generator 230 generates playback data 234 based on player state data 244 and optionally based on frame data buffer contents 236. The frame buffer model generator 220 generates a buffer fullness indicator 242, based on the media client data 222, the buffer increment data 212 and the playback data 234. A player state generator 240 generates the player state data 244, based on the buffer fullness indicator 242, the media client data 222 and the player command data 232.

In an embodiment of the present invention, the frame data analyzer 210 operates in accordance with the media session model 140 to generate buffer increment data 212 when the frame data 202 indicates a particular video frame sent from the media server to the media client and further when the acknowledgement data 204 indicates that that particular video frame was received by the media client. The frame buffer model generator 220 maintains the buffer fullness indicator 242 as an estimate of an amount of frame data stored in a buffer, such as a video buffer or other streaming media buffer of the media client, at any given time. In addition, the frame buffer model generator 220 maintains and stores frame data buffer contents 236 that include information such as: when media frames arrive, the size of the frames and their duration, etc. The frame buffer model generator 220 increases the estimate of the amount of frame data 202 stored in the buffer of the media client in response to the buffer increment data 212 to reflect the arrival of the new frame data 202.

When a media session begins, the player generator 240 generates player state data 244 to indicate a buffer initializing state. The frame data 202 is accumulated in the buffer of the media client. When the buffer fullness indicator 242 indicates that the estimated amount of frame data stored in the buffer reaches a first threshold value, the player state generator 240 generates player state data 244 to indicate a playback state. The playback data generator 230 generates playback data 234 that indicates the playback of a particular video frame, when the playback state data 242 indicates a playback state, provided that the frame buffer model generator indicates an appropriate frame is available for playback. The frame buffer model contents also indicate the playback duration of such a frame. In this fashion, when the player state data 244 indicates that the media client is actually playing and not in a non-playing state, for example, due to a buffer initializing or stall condition, the playback data generator 230 generates playback data 234 as each successive frame is expected to be played. In response to the playback data 234, the frame buffer model generator 220 decreases its estimate of the amount of frame data stored in the buffer of the media client, to indicate the removal of each frame that is played.

If the buffer fullness indicator 242 indicates that the estimated amount of frame data stored in the buffer of the media client has decreased below a second threshold, such as when the estimate reaches zero indicating that all of the received frame data 202 has been played, the player state generator 240 generates playback state data 244 to indicates a stall state. In this case, the playback data generator 230 ceases the generation of playback data 234 until the player state generator 240 indicates a playback state in the player state data 244—when a sufficient buffer level is restored, as specified by a third threshold.

It should also be noted that the playback data generator 230 can also suspend the generation of playback data 234 when the player command data 232 indicates a pause command. Further, the generation of the playback data 234 by playback data generator 230 can be accelerated to decrement the estimate of the amount of frame data stored in the buffer of the media client at a greater rate in response to command data 232 that indicates a fast forward command. The increased frames per second rate can be indicated as a fast forward rate included in the media client data 222. In response to player command data 232 relating to a seek command that repositions the playback of the media stream of the media player, either forward or backward in the program at a new point beyond the storage in the buffer, the playback data generator 230 can generate playback data 234 to restart the initialization of the buffer at the new point.

The media client data 222 can include either default media client data corresponding to a default media player, specific media client data either computed or retrieved from a database based on the media session data or otherwise corresponding to the particular media client in use, or can indicate hypothetical media client data corresponding to a hypothetical media client, such as a conservative client, a typical media client, an aggressive (greedy) media client, or other hypothetical media client. The media client data 222 can include a buffer depth used to indicate thresholds used to determine the buffer fullness required for initial playback and/or resumption of playback after re-buffering events, one or more fast forward frame rates corresponding to different fast forward speeds, and other media client information used by the device to model the conditions of the video buffer.

Session quality analyzer 250 is further included to implement a further embodiment of user model 144 or objective session model 152. The session quality analyzer 250 generates session quality data 252 based on the playback state data 244. For example, the session quality analyzer 250 generates a playback duration and a stall duration corresponding to the media session based on the playback state data 244 and generates the session quality data 252 based on the playback duration and the stall duration.

The frame data analyzer 210, frame buffer model generator 220, playback data generator 230, player state generator 240 and session quality analyzer 250 can be implemented using a single shared processing device or a plurality of processing devices. Such a processing device or devices may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the frame data analyzer 210, frame buffer model generator 220, playback data generator 230, player state generator 240 and/or session quality analyzer 250 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The further operation of the frame data analyzer 210, frame buffer model generator 220, playback data generator 230, player state generator 240 and session quality analyzer 250 can be described in conjunction with the example that follows. In particular, the frame buffer model generator 220 operates a video or audio frame queue that grows based on the duration/size of frames that arrive and are acknowledged at the client device over the network as indicated by buffer increment data 212 generated by frame data analyzer 210 in response to frame data 202 and acknowledgement data 204. Frame arrival information may optionally be compressed by consolidating the information for several consecutive frame arrivals into a single "frame sequence arrival" entity in the queue, which represents the total size and total playback time of the group of frames. The purpose of this compression is to reduce memory requirements in the system. The frames are removed in a decode order at a video play rate (e.g. 24 frames per second), based on the timestamps of the video frames and further based on the playback data 234 generated by playback data generator 230.

Player state generator 240 operates based on several unique and possibly dynamically changing thresholds that can be device and player dependent and optionally indicated by media client data 222 and or can be website dependent and optionally indicated by media server data 224. The first threshold is the amount of playback time represented by the frames in the buffer that is needed in the video buffer before the first video frame is removed and played at the beginning of the media session. A second threshold, (e.g. zero corresponding to a buffer empty condition) causing the playback to stall. The third threshold is the amount of playback time represented by the frames in the buffer that is needed in the video buffer before the first video frame is removed and played after a stall.

The device of FIG. 9 has several advantages over other systems. It can maintain an event-driven, frame-accurate model of the input buffer state for a number of video clients on a network. The frame data analyzer 210 can detect frame arrivals at each media client based on frame boundary positions in the traffic to the client, and monitoring of the acknowledgements from the client that confirm the arrival of that data. Based on information in the frame data 202 indicating with network flow each frame was delivered in, the frame data analyzer 210 detects when a player has performed a "seek" operation and sends a seek indication to the playback state generator 240 as part of seek/switch notification data 238. The playback state generator 240 can track the playback state of each media client over time including the initiation of a seek operation; the initiation of a stall event due to the buffer emptying; and the resumption of playback after stalling due a frame arrival resulting in sufficient time in the buffer to exceed a required threshold. The frame buffer model generator 220 can track the playback of each frame and its removal from the frame data buffer based on playback data 234 when the playback state generator 240 indicates a playing state; discard frames in the buffer in response to playback data 234 because player state data 244 indicates a player has performed a "seek" operation into a different segment of the video, and transitioning the model to be driven by the arrival of frames required to play from this new playback segment. The player state generator 240 can also reflect different site, device, and player behaviors and characteristics based on a small number of thresholds that represent the amount of playback time required in the buffer to begin or resume playback.

The frame data analyzer 210 can intelligently detect "spurious" flows of media traffic that are initiated by some players, but then subsequently ignored (never used for playback). These players may request multiple versions of the same content at essentially the same time, and then ignore and terminate all but one flow. Properly detecting and discarding such flows allows the device to maintain a frame-accurate estimate of the client's buffer and its playback state. To properly detect such flows and maintain accuracy of the client buffer model, the frame data analyzer may update the model of the buffer with a delay of up to several seconds from the latest data that has been received. This method provides a look-ahead window into the future for deciding on which flows may be spurious and which may be valid, based on the frame data arrival information that is available for each flow.

In the case of adaptive streaming protocols, the frame data 202 includes information that identifies which of the multiplicity of available streams each frame is a part of. Based on the amounts of data arriving from various streams, their timestamps and arrival times, the frame data analyzer 210 can intelligently detect stream switch (quality switch) events, as well as seek events and sends a switch indication to the playback state generator 240 as part of seek/switch notification data 238. The detection of these events determines which frames are added to the frame buffer model generator 220. The playback state generator 240 can indicate initiation of a seek operation as player state data 244.

As discussed above, instead of basing playback data 234 and player state data 244 on media client data 222 corresponding to the characteristics of the actual media client involved in the media session, the device can implement a hypothetical video buffer model. The purpose of the hypothetical video buffer model is not to estimate the true client buffer fullness and resultant QoE, but instead, it is intended to expose any deficiencies in the ability of the network to deliver the needed session in real-time and provide a consistent evaluation of network performance across a variety of playback devices. To do this, the parameters of the media client data 222 can be set to consistent values regardless of the actual media client being used. The values may represent an aggressive, conservative, or typical client, in terms of the amount of data required to start or resume playback.

In one example, the hypothetical video buffer model is still filled at the network rate and emptied at the play rate. However, once the buffer is drained, the first frame to be removed is removed as soon as it arrives. In effect, the third threshold required to re-buffer after a stall condition is set to a single frame of data. This hypothetical video buffer model is a "greedy" buffer model, that is consistent for all media sessions, and allows calculation of a normalized and more objective score. Implementation of the hypothetical video buffer model allows precise modeling of the fullness of a "greedy" media client's video buffer by tracking frame arrivals at the media client and assuming fixed and aggressive site, device, and player behavior.

The modeling of the client buffer state for a media player and the generation of the player state data 244 can be useful for multiple reasons. The player state data 244 can be used by the session quality analyzer 250 to directly compute key performance indicators for the video sessions based on the modeled events, such as the number of stalls and their duration, and the amount of data in the buffer over time, etc. The timing of playback and stall events can also be used by the session quality analyzer in the calculation of higher-order QoE metrics or quality scores. Session quality analyzer 250 can generate session quality data 252 such as user model 144 generation of DQS 120 and objective session model 152 generation of NQS 122 or the generation of other session quality data.

Figure 10:
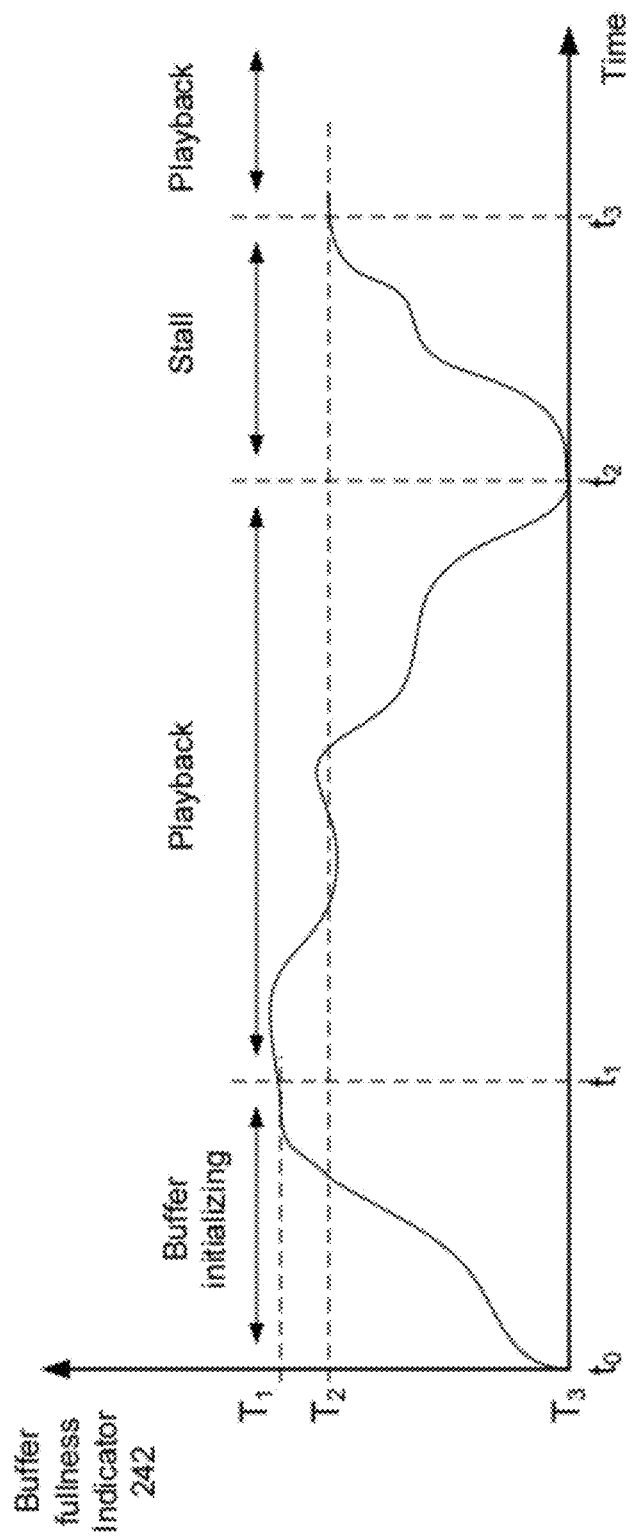
FIG. 10 is a diagram illustrating an example analysis of video buffer fullness in accordance with an embodiment of the present invention.

FIG. 10 is a diagram illustrating an example analysis of video buffer fullness in accordance with an embodiment of the present invention. In particular, an estimated amount of video buffer fullness is presented over time as indicated by buffer fullness indicator 242. When a media session begins at time $t_0$, the player state generator 240 generates player state data 244 to indicate a buffer initializing state. At time $t_1$ the buffer fullness indicator 242 indicates that the estimate of the amount of frame data stored in the buffer reaches a first threshold value $T_1$. In response, the player state generator 240 generates player state data 244 to indicate a playback state. After time $t_1$ the buffer fullness indicator 242 is incremented by buffer increment data 212 when new frames are received and acknowledged and decremented based on playback data as the frames are presumed to be played. In the example shown, at time $t_2$, the buffer fullness indicator 242 indicates that the estimated amount of frame data stored in the buffer of the media client has decreased below a threshold $T_3$, such as when the estimate reaches zero indicating that all of the received frame data 202 has been played. In response, the player state generator 240 generates playback state data 244 to indicate a stall state. At time $t_3$ the buffer fullness indicator 242 indicates that the estimated amount of frame data stored in the buffer reaches a threshold value $T_2$. In this case, the player state generator 240 indicates a playback state in the player state data 244 and the playback data generator 230 resumes the generation of playback data 234 as long as the player command data 232 continues to indicate a playback command.

In this example, the session quality analyzer 250 can calculate session quality data 252 based on the percentage of play duration divided by the play duration and stalled duration, where the play duration is the amount of time the media client was playing at the desired frame rate and the stalled duration is the amount of time a hypothetical player was waiting for frames when it should have been playing. This includes unexpected excess waiting during initial buffering. The score can be sampled at any point that (play duration+stalled duration)>0 according to the following formula:

$$\text{network quality score}=100*\text{play duration}/(\text{play duration}+\text{stalled duration}) \qquad \text{EQ10}$$

In contrast to play duration and stalled duration, there may be other time intervals during a session which can be excluded from network quality score, such as the amount of time the player was paused, the estimated portion of time spent waiting for frames during initial buffering, etc.

As discussed above, the threshold values can be set for either a particular site, player and device or set hypothetically to an aggressive/greedy model. The use of the device, player and site specific media client data 222 and/or media server data 224 allows the model to accurate conform the quality of experience for a particular user during a session.

In contrast, the use of the hypothetical approach allows the calculation of an objective score for delivery of streaming media over a reliable network that supports different variations of hypothetical video buffer state events and media session durations. This objective score, can measure how the network delivered content to a media client (if the network was able to maintain real-time delivery throughout the session). The model can calculate how long the media client had to wait on the network to deliver the media session, in a pessimistic or most pessimistic sense.

Figure 11:
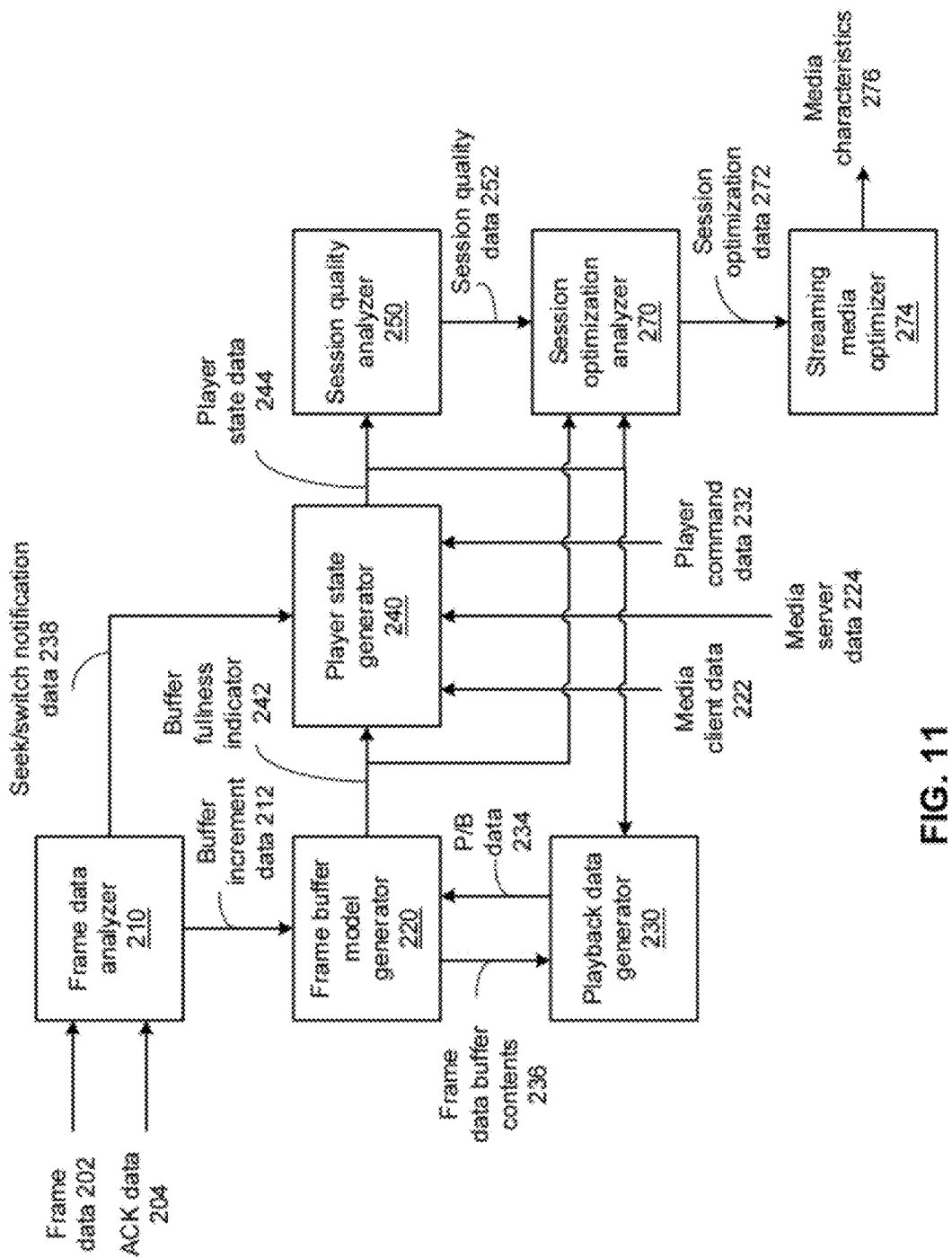
FIG. 11 is a diagram illustrating a device that includes a video buffer model in accordance with another embodiment of the present invention.

FIG. 11 is a diagram illustrating a device that includes a video buffer model in accordance with another embodiment of the present invention. In particular, a device is shown that includes many common elements described in conjunction with FIG. 9 that are referred to by common reference numerals. In addition, a session optimization analyzer 270 is included that analyzes buffer fullness indicator 242, playback state data 244 and optionally session quality data 252 from session quality analyzer 250 in order to generate session optimization data 272. In an embodiment of the present invention, the session optimization data 272 indicates particular session optimization parameters and/or indicates optimization decisions in a format that can be used by a streaming media optimizer 274 to modify one or more characteristics 276 of the generated media traffic that is transmitted on the network with the goal of achieving better streaming media performance.

The session optimization analyzer 270 and streaming media optimizer 274 can be implemented using a single shared processing device or a plurality of processing devices. Such a processing device or devices may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the session optimization analyzer 270 and/or streaming media optimizer 274 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 12:
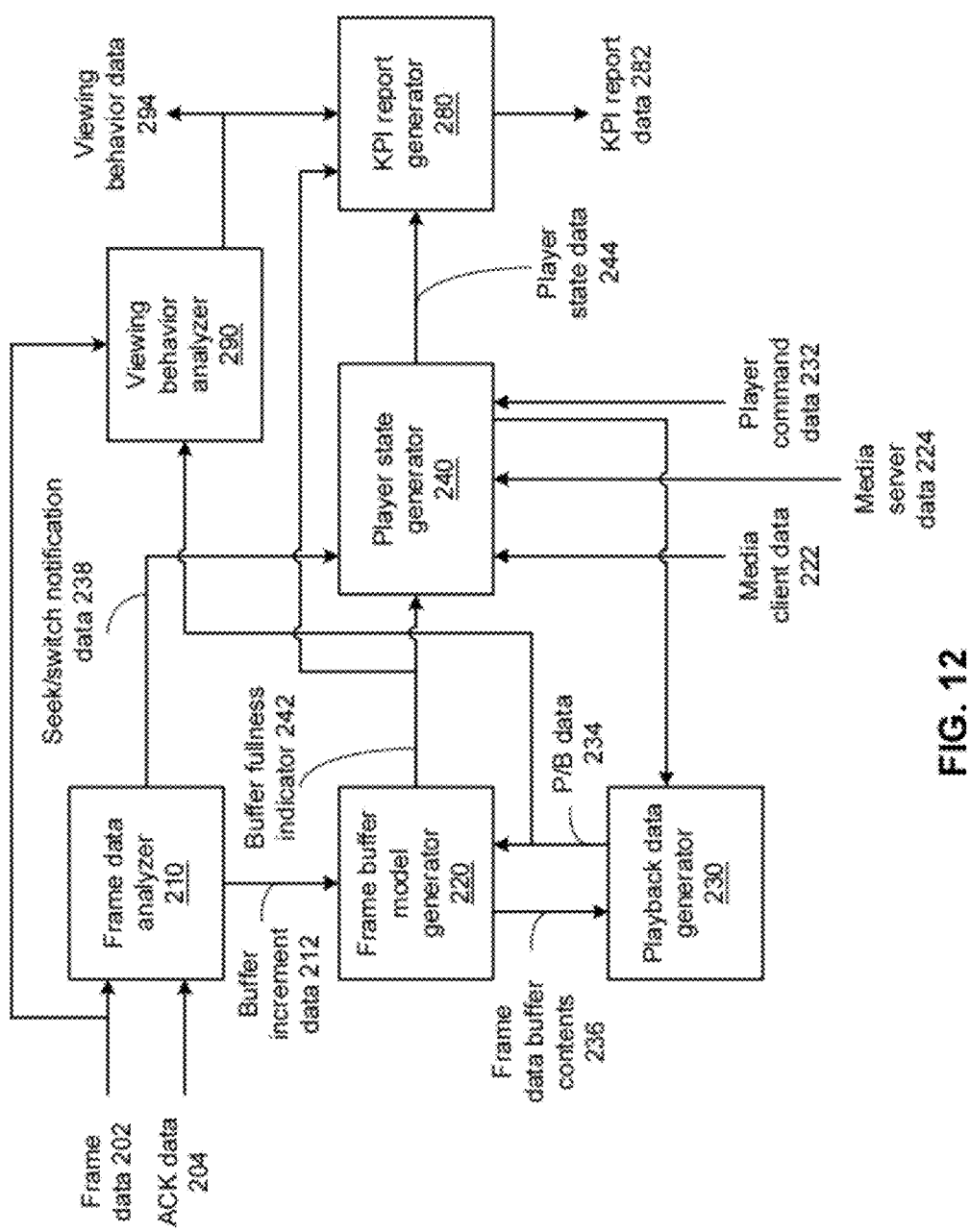
FIG. 12 is a diagram illustrating a device that includes a video buffer model in accordance with another embodiment of the present invention.

FIG. 12 is a diagram illustrating a device that includes a video buffer model in accordance with another embodiment of the present invention. In particular, a device is shown that includes many common elements described in conjunction with FIG. 9 that are referred to be common reference numerals. In addition, a viewing behavior analyzer 290 is included that generates viewing behavior data 294 based on frame data 202 that indicates when a frame is streamed and playback data 234 that indicates when a frame is played. The viewing behavior data 294 can be generated to indicate, for example, the streamed duration and the watched duration for various media traffic.

A key performance index (KPI) report generator 280 generates KPI report data 282 based on the viewing behavior data 294, the buffer fullness indicator 242 and the player state data 244. The KPI report data 282 can include streamed duration, watched duration, the number, frequency and duration of stalls, an average, minimum or maximum buffer fullness and other performance indicators of one or more media sessions. In an embodiment of the present invention, the average, minimum or maximum buffer fullness are calculated by the KPI report generator 280 by tracking the values of the buffer fullness indicator 242 however, in a further embodiment, the buffer fullness indicator 242 includes instantaneous values of buffer fullness as well as other statistics such as, median, average, minimum and maximum buffer fullness calculated for a particular media session.

The viewing behavior analyzer 290 and KPI report generator 280 can be implemented using a single shared processing device or a plurality of processing devices. Such a processing device or devices may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when the viewing behavior analyzer 290 and/or KPI report generator 280 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 13:
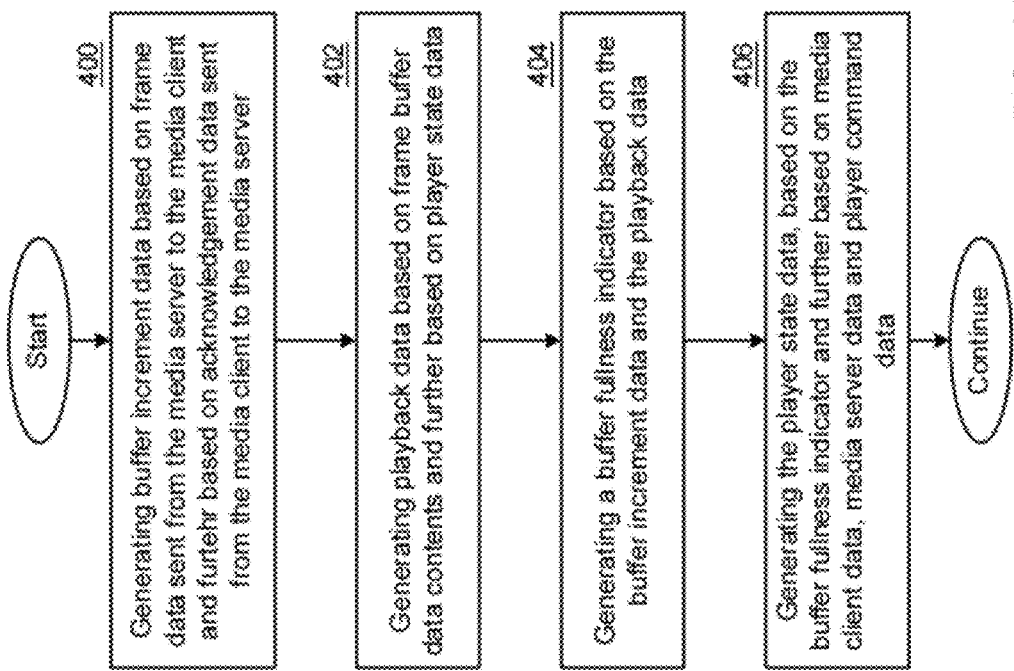
FIG. 13 is a diagram illustrating a method in accordance with an embodiment of the present invention.

FIG. 13 is a diagram illustrating a method in accordance with an embodiment of the present invention. In particular, a method is presented for use in conjunction with one or more functions and features described in conjunction with FIGS. 1-10. In step 400, buffer increment data is generated based on frame data sent from the media server to the media client and further based on acknowledgement data sent from the media client to the media server. In step 402, playback data is generated based on frame data buffer contents and further based on player state data. In step 404, a buffer fullness indicator and the frame data buffer contents are generated, based on the buffer increment data and the playback data. In step 406, the player state data is generated based on the buffer fullness indicator and further based on media client data, media server data and player command data.

In an embodiment of the present invention, the buffer fullness indicator indicates an estimate of an amount of frame data stored in a buffer of the media client. The buffer increment data can be generated when the frame data indicates a particular video frame sent from the media server to the media client and step 404 can include increasing the estimate of the amount of frame data stored in the buffer of the media client in response to the buffer increment data. The playback data can indicates the playback of a particular media frame when the playback state data indicates a playback state and step 404 can include decreasing the estimate of the amount of frame data stored in the buffer of the media client in response to the playback data.

In an embodiment of the present invention, the playback state data indicates a playback state when the estimate of the amount of frame data stored in the buffer of the media client increases to a first threshold. The playback state data indicates a stall state when the estimate of the amount of frame data stored in the buffer of the media client decreases to a second threshold. The first threshold can be generated based on at least one of: media server data and the media client data. The media client data can include at least one of: default media client data; specific media client data corresponding to the media client; and hypothetical media client data.

Figure 14:
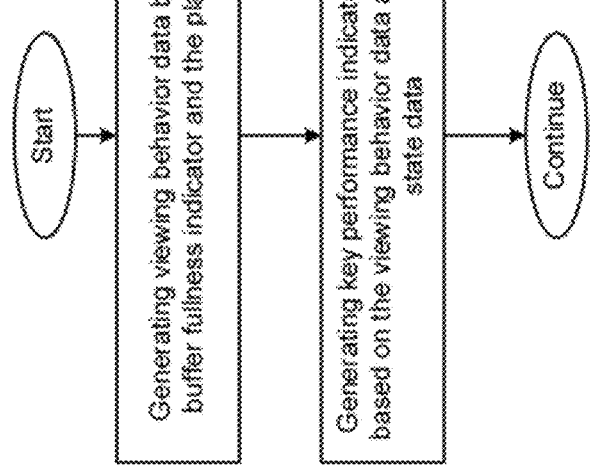
FIG. 14 is a diagram illustrating a method in accordance with an embodiment of the present invention.

FIG. 14 is a diagram illustrating a method in accordance with an embodiment of the present invention. In particular, a method is presented for use in conjunction with one or more functions and features described in conjunction with FIGS. 1-13. In step 410, viewing behavior data is generated based on the frame data and the playback data. In step 412, key performance indicator (KPI) report data is generated based on the viewing behavior data and the player state data.

FIG. 15 is a diagram illustrating a method in accordance with an embodiment of the present invention. In particular, a method is presented for use in conjunction with one or more functions and features described in conjunction with FIGS. 1-14. In step 420, session optimization data is generated based on the buffer fullness indicator and the player state data.

FIG. 16 is a diagram illustrating a method in accordance with an embodiment of the present invention. In particular, a method is presented for use in conjunction with one or more functions and features described in conjunction with FIGS. 1-15. In step 430, session quality data is generated based on the playback state data. Generating the session quality data can include generating a playback duration and a stall duration corresponding to the media session based on the playback state data.

FIG. 17 is a diagram illustrating a method in accordance with an embodiment of the present invention. In particular, a method is presented for use in conjunction with one or more functions and features described in conjunction with FIGS. 1-16. In step 440, a playback duration and a stall duration are generated corresponding to the media session based on the playback state data. In step 442, session quality data is generated based on the playback duration and the stall duration. In step 444, session optimization data is generated based on session quality data, the buffer fullness indicator and the player state data.

While particular combinations of various functions and features of the present invention have been expressly described herein, other combinations of these features and functions are possible that are not limited by the particular examples disclosed herein are expressly incorporated within the scope of the present invention.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a data distribution network and a monitoring system for use therewith and with networks. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

The invention claimed is:

1. A device for use in a system that analyzes media session data communicated via a network between a media server and a media client, the device comprising:

processing hardware that is separate from the media server and the media client and that includes:
  a frame data analyzer that generates estimated buffer increment data based on frame data sent from the media server to the media client and further based on acknowledgement data sent from the media client to the media server;
  a playback data generator that generates estimated playback data based on estimated frame data buffer contents that includes the estimated buffer increment data and further based on estimated player state data that indicates an estimated state of a plurality of possible player states that include an estimated playback state that corresponds to estimated playback by the media client and an estimated stall state where the media client is estimated to be re-initializing;
  frame buffer model generator, coupled to the frame data analyzer and the playback data generator, that generates an estimated buffer fullness indicator, based on the estimated buffer increment data and the estimated playback data;
  a player state generator, coupled to the frame buffer model generator, that generates the estimated player state data including the estimated playback state that corresponds to the estimated playback by the media client and the estimated stall state where the media client is estimated to be re-initializing, based on the estimated buffer fullness indicator and further based on media client data indicating buffer depth, without data from the media client that indicates an actual amount of frame data stored in a buffer of the media client, an actual playback state of the media client and an actual stall state of the media client; and
  a key performance indicator (KPI) report generator coupled to the frame buffer model generator and the player state generator, that generates a report that includes KPI report data generated based on the estimated buffer fullness indicator and the estimated player state data.

2. The device of claim 1 wherein the estimated buffer fullness indicator indicates an estimate of the actual amount of frame data stored in the buffer of the media client.

3. The device of claim 2 wherein the frame data analyzer generates the estimated buffer increment data when the frame data and the acknowledgement data indicate a particular video frame sent from the media server to the media client has arrived at the media client; and
    wherein the frame buffer model generator increases the estimated buffer fullness indicator in response to the estimated buffer increment data.

4. The device of claim 2 wherein the playback data generator generates the estimated playback data that indicates the estimated playback of a particular media frame when the estimated player state data indicates the estimated playback state; and
    wherein the frame buffer model generator decreases the estimated buffer fullness indicator in response to the estimated playback data.

5. The device of claim 2 wherein the estimated player state data indicates the estimated playback state when the estimated buffer fullness indicator increases to a first threshold;
    wherein the estimated player state data indicates the estimated stall state when the estimated buffer fullness indicator decreases to a second threshold; and
    wherein the first threshold is generated based on at least one of: media server data and the media client data.

6. The device of claim 1 further comprising:
a viewing behavior analyzer, coupled to the frame buffer model generator and the playback data generator, that generates viewing behavior data based on the frame data and the estimated playback data;
    wherein the KPI report generator is further coupled to the viewing behavior analyzer, and generates the KPI report data further based on the viewing behavior data.

7. The device of claim 1 wherein the media client data further includes at least one of: default media client data; specific media client data corresponding to the media client; and hypothetical media client data.

8. The device of claim 1 further comprising:
a session optimization analyzer, coupled to the frame buffer model generator and the player state generator, that generates session optimization data based on the estimated buffer fullness indicator and the estimated player state data.

9. The device of claim 1 further comprising:
a session quality analyzer, coupled to the playback data generator, that generates session quality data based on the estimated player state data.

10. The device of claim 1 further comprising:
a session quality analyzer, coupled to the player state generator, that generates an estimated playback duration and an estimated stall duration corresponding to the media session based on the estimated player state data and generates session quality data based on the estimated playback duration and the estimated stall duration; and
a session optimization analyzer, coupled to the frame buffer model generator and the player state generator, that generates session optimization data based on session quality data, the estimated buffer fullness indicator and the estimated player state data.

11. The device of claim 1 wherein the frame data analyzer detects at least one spurious flow of a plurality of media traffic flows, wherein the at least one spurious flow is not used for playback.

12. The device of claim 11 wherein the frame data analyzer detects the at least one spurious flow based on a look-ahead of frame arrival information for the plurality of media traffic flows.

13. The device of claim 1 wherein the frame data analyzer detects a stream switch operation from a first media traffic flow to a second media traffic flow and generates stream switch notification data in response thereto.

14. A method for use in a system that analyzes media session data communicated via a network between a media server and a media client, the method comprising:
    generating estimated buffer increment data based on frame data sent from the media server to the media client and further based on acknowledgement data sent from the media client to the media server;
    generating estimated playback data based on estimated frame data buffer contents and further based on estimated player state data that indicates an estimated state of a plurality of possible player states that include an estimated playback state that corresponds to estimated playback by the media client and an estimated stall state where the media client is estimated to be re-initializing;
    generating an estimated buffer fullness indicator, based on the estimated buffer increment data and the estimated playback data;
    generating the estimated player state data including the estimated playback state that corresponds to the estimated playback by the media client and the estimated stall state where the media client is estimated to be re-initializing, based on the estimated buffer fullness indicator and further based on media client data indicating buffer depth, without data from the media client that indicates an actual amount of frame data stored in a buffer of the media client, an actual playback state of the media client and an actual stall state of the media client; and
    generating a report that includes key performance indicator (KPI) report data generated based on the estimated buffer fullness indicator and the estimated player state data.

15. The method of claim 14 wherein the estimated buffer fullness indicator indicates an estimate of the actual amount of frame data stored in the buffer of the media client.

16. The method of claim 15 wherein the estimated buffer increment data is generated when the frame data and the acknowledgement data indicate a particular video frame sent from the media server to the media client has arrived at the media client; and
    wherein the frame buffer model generator increases the estimated buffer fullness indicator in response to the estimated buffer increment data.

17. The method of claim 15 wherein the estimated playback data indicates the estimated playback of a particular media frame when the estimated player state data indicates the estimated playback state; and
    wherein generating the estimated buffer fullness indicator includes decreasing estimated buffer fullness indicator in response to the estimated playback data.

18. The method of claim 15 indicates the estimated playback state when the estimated buffer fullness indicator increases to a first threshold;

wherein the estimated player state data indicates the estimated stall state when the estimated buffer fullness indicator decreases to a second threshold; and wherein the first threshold is generated based on at least one of: media server data and the media client data.

19. The method of claim 14 further comprising:

generating viewing behavior data based on the frame data and the estimated playback data; and wherein the KPI report data is further generated based on the viewing behavior data.

20. The method of claim 14 wherein the media client data further includes at least one of: default media client data; specific media client data corresponding to the media client; and hypothetical media client data.

21. The method of claim 14 further comprising:

generating session optimization data based on the estimated buffer fullness indicator and the estimated player state data.

22. The method of claim 14 further comprising:

generating session quality data based on the estimated player state data.

23. The method of claim 14 further comprising:

generating an estimated playback duration and an estimated stall duration corresponding to the media session based on the estimated player state data;

generating session quality data based on the estimated playback duration and the estimated stall duration; and generating session optimization data based on session quality data, the estimated buffer fullness indicator and the estimated player state data.

* * * * *